US009867025B2

(12) United States Patent
Cho et al.

(10) Patent No.: US 9,867,025 B2
(45) Date of Patent: Jan. 9, 2018

(54) MOBILE TERMINAL AND METHOD FOR CONTROLLING SAME

(75) Inventors: Hangyu Cho, Anyang-si (KR); Minseok Oh, Anyang-si (KR); Kyujin Park, Anyang-si (KR)

(73) Assignee: LG ELECTRONICS INC., Seoul (KR)

(*) Notice: Subject to any disclaimer, the term of this patent is extended or adjusted under 35 U.S.C. 154(b) by 65 days.

(21) Appl. No.: 14/114,491

(22) PCT Filed: Apr. 30, 2012

(86) PCT No.: PCT/KR2012/003362
§ 371 (c)(1),
(2), (4) Date: Dec. 9, 2013

(87) PCT Pub. No.: WO2012/148242
PCT Pub. Date: Nov. 1, 2012

(65) Prior Publication Data
US 2014/0087770 A1 Mar. 27, 2014

Related U.S. Application Data

(60) Provisional application No. 61/480,351, filed on Apr. 28, 2011.

(51) Int. Cl.
*H04W 4/02* (2009.01)
*H04W 8/00* (2009.01)
(Continued)

(52) U.S. Cl.
CPC .......... *H04W 8/005* (2013.01); *H04W 4/02* (2013.01); *H04W 4/023* (2013.01); *H04W 64/00* (2013.01); *H04W 4/043* (2013.01)

(58) Field of Classification Search
CPC ..... H04W 24/00; H04W 40/00; H04W 64/00; H04M 3/00
(Continued)

(56) References Cited

U.S. PATENT DOCUMENTS 7,039,427 B2      5/2006  Tachikawa
7,382,271 B2 *   6/2008  McFarland ............ G05B 15/02
                                                        340/539.2
(Continued)

FOREIGN PATENT DOCUMENTS

KR    10-2005-0079379    8/2005
KR    10-2009-0038195    4/2009
(Continued)

OTHER PUBLICATIONS

PCT International Application No. PCT/KR2012/003362, Written Opinion of the International Searching Authority dated Nov. 28, 2012, 19 pages.
(Continued)

*Primary Examiner* — Vladimir Magloire
*Assistant Examiner* — Majid Syed
(74) *Attorney, Agent, or Firm* — Lee Hong Degerman Kang Waimey

(57) ABSTRACT

The present invention provides a mobile terminal comprising: a wireless communication unit for sensing a location of a mobile terminal, and receiving, from the outside, a place image corresponding to the location of the mobile terminal and neighboring terminal information of at least one neighboring terminal at the same place as the mobile terminal; a control unit for generating a device map on which the neighboring terminal which is at the same place as the mobile terminal, is displayed on the basis of the place image and the neighboring terminal information; a memory for storing the device map; and a display unit for displaying the device map.

17 Claims, 17 Drawing Sheets

(51) Int. Cl.
*H04W 64/00* (2009.01)
*H04W 4/04* (2009.01)

(58) Field of Classification Search
USPC .............................. 455/456, 456.1, 419, 457
See application file for complete search history.

(56) References Cited

U.S. PATENT DOCUMENTS

| | | | | |
|---|---|---|---|---|
| 7,881,733 | B2* | 2/2011 | Staton et al. | ............... 455/456.6 |
| 8,301,159 | B2* | 10/2012 | Hamynen | ............. H04W 24/00 |
| | | | | 455/456.1 |
| 2007/0135135 | A1* | 6/2007 | Brown | ............... H04M 1/72572 |
| | | | | 455/456.1 |
| 2009/0201896 | A1* | 8/2009 | Davis | .................... H04W 84/18 |
| | | | | 370/338 |
| 2010/0210287 | A1* | 8/2010 | De Vries | ............. H04L 63/0492 |
| | | | | 455/456.3 |
| 2011/0065451 | A1* | 3/2011 | Danado | ............. H04M 1/72569 |
| | | | | 455/456.1 |
| 2011/0244878 | A1* | 10/2011 | Kochetkov | ..... H04M 1/274516 |
| | | | | 455/456.1 |
| 2012/0146918 | A1* | 6/2012 | Kreiner | ............... H04M 1/7253 |
| | | | | 345/173 |
| 2014/0098247 | A1* | 4/2014 | Rao | ........................ H04W 4/20 |
| | | | | 348/207.1 |

FOREIGN PATENT DOCUMENTS

| | | |
|---|---|---|
| KR | 10-2010-0083044 | 7/2010 |
| KR | 10-2011-0024785 | 3/2011 |
| KR | 10-2011-0035038 | 4/2011 |
| KR | 10-2011-0117843 | 10/2011 |

OTHER PUBLICATIONS

Korean Intellectual Property Office Application Serial No. 10-2013-7030244, Notice of Allowance dated Jan. 26, 2016, 4 pages.

* cited by examiner (a)

(b)

(a)

(b)

MOBILE TERMINAL AND METHOD FOR CONTROLLING SAME

CROSS-REFERENCE TO RELATED APPLICATIONS

This application is the National Stage filing under 35 U.S.C. 371 of International Application No. PCT/KR2012/003362, filed on Apr. 30, 2012, which claims the benefit of U.S. Provisional Application Ser. No. 61/480,351, filed on Apr. 28, 2011, the contents of which are hereby incorporated by reference herein in their entirety.

TECHNICAL FIELD

The present invention relates to a mobile terminal and controlling method thereof, by which a use of a terminal can be implemented in further consideration of user's convenience.

BACKGROUND ART

Generally, terminals can be classified into mobile/portable terminals and stationary terminals. The mobile terminals can be further classified into handheld terminals and vehicle mount terminals according to possibility of user's direct portability.

As functions of the terminal are getting diversified, the terminal tends to be implemented as a multimedia player provided with composite functions such as photographing of photos or videos, playback of music or video files, game play, broadcast reception and the like for example.

Moreover, a mobile terminal is applicable as one component of a home automation system for controlling home appliances situated at home remotely. A home automation service is provided to remotely control operations of home appliances situated at home. And, a mobile terminal is usable as a means for controlling the home appliances. In this case, a user can control the home appliances at home at any time only if carrying the mobile terminal.

Yet, it does not happen frequently that a user actually controls home appliances at home in a remote place from home. On the contrary, it may happen more frequently that a user activates a cooling/heating system or an illumination device through the home automation system in case of arriving in the vicinity of home rather than being located in a remote place from home. Hence, it may be unnecessary for the home automation service to be applied to the mobile terminal in case that a user is remote from home. Instead, it may be more effective to the user if an appropriate service corresponding to a location of the mobile terminal carried by the user is provided.

For instance, if the mobile terminal approaches in the vicinity of home, the home automation service is applied. If the mobile terminal approaches in the vicinity of an office, an office automation system is applied. Therefore, such settings it will be preferable for user's convenience.

DISCLOSURE OF THE INVENTION

Technical Tasks

Accordingly, the present invention is directed to a mobile terminal and controlling method thereof that substantially obviate one or more problems due to limitations and disadvantages of the related art, by which convenience of a user of the mobile terminal can be enhanced.

In particular, one object of the present invention is to provide a service appropriate for a mobile terminal with reference to a mobile terminal located place.

Another object of the present invention is to provide information on a neighbor terminal neighbor to a mobile terminal with reference to a mobile terminal located place.

A further object of the present invention is to enable a communication to be performed between a mobile terminal and a neighbor terminal, by which prescribed data can be received from the neighbor terminal estimated to be exposed to the same environment of the mobile terminal or by which an operation of the neighbor terminal can be controlled.

Technical tasks obtainable from the present invention are non-limited by the above-mentioned technical tasks. And, other unmentioned technical tasks can be clearly understood from the following description by those having ordinary skill in the technical field to which the present invention pertains.

Technical Solution

To achieve these and other advantages and in accordance with the purpose of the present invention, as embodied and broadly described, a mobile terminal according to the present invention includes a wireless communication unit configured to detect a location of the mobile terminal, and externally receive a place image corresponding to the location of the mobile terminal and a neighbor terminal information on at least one neighbor terminal located at a same place of the mobile terminal, a controller configured to create a device map for displaying the neighbor terminal located at the same place of the mobile terminal based on the place image and the neighbor terminal information, a memory storing the device map, and a display unit configured to display the device map.

Preferably, the neighbor terminal information may correspond to the neighbor terminal located within a prescribed spaced distance from the mobile terminal or the neighbor terminal belonging to a same network cell of the wireless communication unit.

Preferably, the memory further stores a search parameter designating a terminal category. The controller configured to determine whether the neighbor device is categorized into the terminal category determined by the search parameter. If the neighbor terminal is categorized into the terminal category determined by the search parameter, the controller may control the neighbor device to be displayed on the device map.

Preferably, the controller may create the device map in a manner of displaying a location of the neighbor terminal on the place image.

Advantageous Effects

Accordingly, a mobile terminal and controlling method thereof according to the present invention may provide the following effects and/or features.

According to at least one of embodiments of the present invention, a service appropriate for a mobile terminal can be provided with reference to a mobile terminal located place.

According to at least one of embodiments of the present invention, information on a neighbor terminal neighbor can be provided to a mobile terminal with reference to a mobile terminal located place.

Moreover, the present invention enables a communication to be performed between a mobile terminal and a neighbor terminal, by which prescribed data can be received from the neighbor terminal estimated to be exposed to the same environment of the mobile terminal or by which an operation of the neighbor terminal can be remotely controlled.

Effects obtainable from the present invention are non-limited by the above mentioned effect. And, other unmentioned effects can be clearly understood from the following description by those having ordinary skill in the technical field to which the present invention pertains.

BEST MODE FOR INVENTION

In the following detailed description, reference is made to the accompanying drawing figures which form a part hereof, and which show by way of illustration specific embodiments of the invention. As used herein, the suffixes 'module', 'unit' and 'part' are used for elements in order to facilitate the disclosure only. Therefore, significant meanings or roles are not given to the suffixes themselves and it is understood that the 'module', 'unit' and 'part' can be used together or interchangeably.

The present invention can be applicable to a various types of mobile terminals. Examples of such terminals include mobile phones, user equipments, smart phones, digital broadcast receivers, personal digital assistants, laptop computers, portable multimedia players (PMP), navigators and the like. Yet, it is apparent to those skilled in the art that a configuration according to an embodiment disclosed in this specification is applicable to such a fixed terminal as a digital TV, a desktop computer and the like as well as a mobile terminal.

Figure 1:
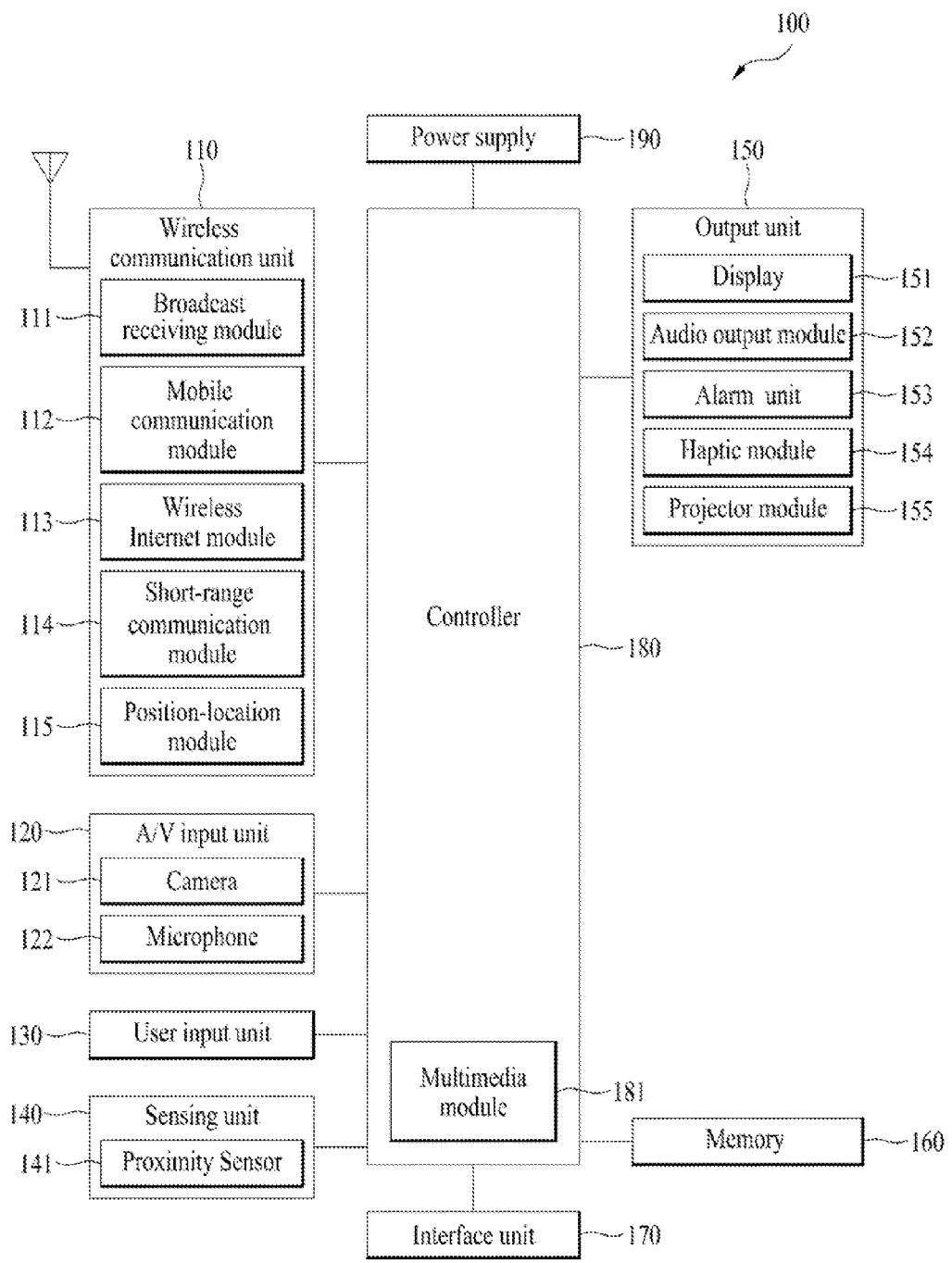
FIG. 1 is a block diagram of a mobile terminal according to one embodiment of the present invention.

FIG. 1 is a block diagram of a mobile terminal in accordance with an embodiment of the present invention.

The mobile terminal 100 according to one embodiment of the present invention includes a wireless communication unit 110, an A/V (audio/video) input unit 120, a user input unit 130, a sensing unit 140, an output unit 150, a memory 160, an interface unit 170, a controller 180, a power supply unit 190 and the like. FIG. 1 shows the mobile terminal 100 having various components, but it is understood that implementing all of the illustrated components is not a requirement. Greater or fewer components may alternatively be implemented.

In the following description, the above elements of the mobile terminal 100 are explained in sequence.

First of all, the wireless communication unit 110 typically includes one or more components which permits wireless communication between the mobile terminal 100 and a wireless communication system or network within which the mobile terminal 100 is located. For instance, the wireless communication unit 110 can include a broadcast receiving module 111, a mobile communication module 112, a wireless internet module 113, a short-range communication module 114, a position-location module 115 and the like.

The broadcast receiving module 111 receives a broadcast signal and/or broadcast associated information from an external broadcast managing server via a broadcast channel. The broadcast channel may include a satellite channel and a terrestrial channel. At least two broadcast receiving modules 111 can be provided to the mobile terminal 100 in pursuit of simultaneous receptions of at least two broadcast channels or broadcast channel switching facilitation.

The broadcast managing server generally refers to a server which generates and transmits a broadcast signal and/or broadcast associated information or a server which is provided with a previously generated broadcast signal and/or broadcast associated information and then transmits the provided signal or information to a terminal. The broadcast signal may be implemented as a TV broadcast signal, a radio broadcast signal, and a data broadcast signal, among others. If desired, the broadcast signal may further include a broadcast signal combined with a TV or radio broadcast signal.

The broadcast associated information includes information associated with a broadcast channel, a broadcast program, a broadcast service provider, etc. And, the broadcast associated information can be provided via a mobile communication network. In this case, the broadcast associated information can be received by the mobile communication module 112.

The broadcast associated information can be implemented in various forms. For instance, broadcast associated information may include an electronic program guide (EPG) of digital multimedia broadcasting (DMB) and electronic service guide (ESG) of digital video broadcast-handheld (DVB-H).

The broadcast receiving module 111 may be configured to receive broadcast signals transmitted from various types of broadcast systems. By nonlimiting example, such broadcasting systems include digital multimedia broadcasting-terrestrial (DMB-T), digital multimedia broadcasting-satellite (DMB-S), digital video broadcast-handheld (DVB-H), Convergence of Broadcasting and Mobile Service (DVB-CBMS), Open Mobile Alliance-BroadCAST (OMA-BCAST), China Multimedia Mobile Broadcasting (CMMB), Mobile Broadcasting Business Management System (MBBMS), the data broadcasting system known as media forward link only (MediaFLO®) and integrated services digital broadcast-terrestrial (ISDB-T). Optionally, the broadcast receiving module 111 can be configured suitable for other broadcasting systems as well as the above-explained digital broadcasting systems.

The broadcast signal and/or broadcast associated information received by the broadcast receiving module 111 may be stored in a suitable device, such as a memory 160.

The mobile communication module 112 transmits/receives wireless signals to/from one or more network entities (e.g., base station, external terminal, server, etc.) via a mobile network such as GSM (Global System for Mobile communications), CDMA (Code Division Multiple Access), WCDMA (Wideband CDMA) and so on. Such wireless signals may represent audio, video, and data according to text/multimedia message transceivings, among others.

The wireless internet module 113 supports Internet access for the mobile terminal 100. This module may be internally or externally coupled to the mobile terminal 100. In this case, the wireless Internet technology can include WLAN (Wireless LAN) (Wi-Fi), Wibro (Wireless broadband), Wimax (World Interoperability for Microwave Access), HSDPA (High Speed Downlink Packet Access), GSM, CDMA, WCDMA, LTE (Long Term Evolution) etc.

Wireless internet access by Wibro, HSPDA, GSM, CDMA, WCDMA, LTE or the like is achieved via a mobile communication network. In this aspect, the wireless internet module 113 configured to perform the wireless internet access via the mobile communication network can be understood as a sort of the mobile communication module 112.

The short-range communication module 114 facilitates relatively short-range communications. Suitable technologies for implementing this module include radio frequency identification (RFID), infrared data association (IrDA), ultra-wideband (UWB), as well at the networking technologies commonly referred to as Bluetooth and ZigBee, to name a few.

The position-location module 115 identifies or otherwise obtains the location of the mobile terminal 100. If desired, this module may be implemented with a global positioning system (GPS) module. According to the current technology, the GPS module 115 is able to precisely calculate current 3-dimensional position information based on at least one of longitude, latitude and altitude and direction (or orientation) by calculating distance information and precise time information from at least three satellites and then applying triangulation to the calculated information. Currently, location and time informations are calculated using three satellites, and errors of the calculated location position and time informations are then amended using another satellite. Besides, the GPS module 115 is able to calculate speed information by continuously calculating a real-time current location.

Referring to FIG. 1, the audio/video (A/V) input unit 120 is configured to provide audio or video signal input to the mobile terminal 100. As shown, the A/V input unit 120 includes a camera 121 and a microphone 122. The camera 121 receives and processes image frames of still pictures or video, which are obtained by an image sensor in a video call mode or a photographing mode. And, the processed image frames can be displayed on the display 151.

The image frames processed by the camera 121 can be stored in the memory 160 or can be externally transmitted via the wireless communication unit 110. Optionally, at least two cameras 121 can be provided to the mobile terminal 100 according to environment of usage.

The microphone 122 receives an external audio signal while the portable device is in a particular mode, such as phone call mode, recording mode and voice recognition. This audio signal is processed and converted into electric audio data. The processed audio data is transformed into a format transmittable to a mobile communication base station via the mobile communication module 112 in case of a call mode. The microphone 122 typically includes assorted noise removing algorithms to remove noise generated in the course of receiving the external audio signal.

The user input unit 130 generates input data responsive to user manipulation of an associated input device or devices. Examples of such devices include a button 136 provided to front/rear/lateral side of the mobile terminal 100 and a touch sensor (constant pressure/electrostatic) 137 and may further include a key pad, a dome switch, a jog wheel, a jog switch and the like [not shown in the drawing].

The sensing unit 140 provides sensing signals for controlling operations of the mobile terminal 100 using status measurements of various aspects of the mobile terminal. For instance, the sensing unit 140 may detect an open/close status of the mobile terminal 100, relative positioning of components (e.g., a display and keypad) of the mobile terminal 100, a change of position of the mobile terminal 100 or a component of the mobile terminal 100, a presence or absence of user contact with the mobile terminal 100, orientation or acceleration/deceleration of the mobile terminal 100. By nonlimiting example, such sensing unit 140 include, gyro sensor, accelerate sensor, geomagnetic sensor.

The output unit 150 generates outputs relevant to the senses of sight, hearing, touch and the like. And, the output unit 150 includes the display 151, an audio output module 152, an alarm unit 153, and a haptic module 154 and the like.

The display 151 is typically implemented to visually display (output) information associated with the mobile terminal 100. For instance, if the mobile terminal is operating in a phone call mode, the display will generally provide a user interface (UI) or graphical user interface (GUI) which includes information associated with placing, conducting, and terminating a phone call. As another example, if the mobile terminal 100 is in a video call mode or a photographing mode, the display 151 may additionally or alternatively display images which are associated with these modes, the UI or the GUI.

The display module 151 may be implemented using known display technologies including, for example, a liquid crystal display (LCD), a thin film transistor-liquid crystal display (TFT-LCD), an organic light-emitting diode display (OLED), a flexible display and a three-dimensional display. The mobile terminal 100 may include one or more of such displays.

Some of the above displays can be implemented in a transparent or optical transmittive type, which can be named a transparent display. As a representative example for the transparent display, there is TOLED (transparent OLED) or the like. A rear configuration of the display 151 can be implemented in the optical transmittive type as well. In this configuration, a user is able to see an object in rear of a terminal body via the area occupied by the display 151 of the terminal body.

At least two displays 151 can be provided to the mobile terminal 100 in accordance with the implemented configuration of the mobile terminal 100. For instance, a plurality of displays can be arranged on a single face of the mobile terminal 100 in a manner of being spaced apart from each other or being built in one body. Alternatively, a plurality of displays can be arranged on different faces of the mobile terminal 100.

In case that the display 151 and the touch sensor 137 configures a mutual layer structure (hereinafter called 'touch screen'), it is able to use the display 151 as an input device as well as an output device. In this case, the touch sensor can be configured as a touch film, a touch sheet, a touchpad or the like.

The touch sensor 137 can be configured to convert a pressure applied to a specific portion of the display 151 or a variation of a capacitance generated from a specific portion of the display 151 to an electric input signal. Moreover, it is able to configure the touch sensor 137 to detect a pressure of a touch as well as a touched position or size.

If a touch input is made to the touch sensor 137, signal(s) corresponding to the touch is transferred to a touch controller. The touch controller processes the signal(s) and then transfers the processed signal(s) to the controller 180. Therefore, the controller 180 is able to know whether a prescribed portion of the display 151 is touched.

Referring to FIG. 2, a proximity sensor (141) can be provided to an internal area of the mobile terminal 100 enclosed by the touchscreen or around the touchscreen. The proximity sensor is the sensor that detects a presence or non-presence of an object approaching a prescribed detecting surface or an object existing around the proximity sensor using an electromagnetic field strength or infrared ray without mechanical contact. Hence, the proximity sensor has durability longer than that of a contact type sensor and also has utility wider than that of the contact type sensor.

The proximity sensor can include one of a transmittive photoelectric sensor, a direct reflective photoelectric sensor, a mirror reflective photoelectric sensor, a radio frequency oscillation proximity sensor, an electrostatic capacity proximity sensor, a magnetic proximity sensor, an infrared proximity sensor and the like. In case that the touchscreen includes the electrostatic capacity proximity sensor, it is configured to detect the proximity of a pointer using a variation of electric field according to the proximity of the pointer. In this case, the touchscreen (touch sensor) can be classified as the proximity sensor.

For clarity and convenience of the following description, as a pointer becomes proximate to a touchscreen without coming into contact with the touchscreen, if the pointer is perceived as situated over the touchscreen, such an action shall be named 'proximity touch'. If a pointer actually comes into contact with a touchscreen, such an action shall be named 'contact touch'. A proximity-touched position over the touchscreen with the pointer may mean a position at which the pointer vertically opposes the touchscreen when the touchscreen is proximity-touched with the pointer.

The proximity sensor detects a proximity touch and a proximity touch pattern (e.g., a proximity touch distance, a proximity touch duration, a proximity touch position, a proximity touch shift state, etc.). And, information corresponding to the detected proximity touch action and the detected proximity touch pattern can be outputted to the touchscreen.

The audio output module 152 functions in various modes including a call-receiving mode, a call-placing mode, a recording mode, a voice recognition mode, a broadcast reception mode and the like to output audio data which is received from the wireless communication unit 110 or is stored in the memory 160. During operation, the audio output module 152 outputs audio relating to a particular function (e.g., call received, message received, etc.). The audio output module 152 is often implemented using one or more speakers, buzzers, other audio producing devices, and combinations thereof.

The alarm unit 153 is output a signal for announcing the occurrence of a particular event associated with the mobile terminal 100. Typical events include a call received event, a message received event and a touch input received event. The alarm unit 153 is able to output a signal for announcing the event occurrence by way of vibration as well as video or audio signal. The video or audio signal can be outputted via the display 151 or the audio output unit 152. Hence, the display 151 or the audio output module 152 can be regarded as a part of the alarm unit 153.

The haptic module 154 generates various tactile effects that can be sensed by a user. Vibration is a representative one of the tactile effects generated by the haptic module 154. Strength and pattern of the vibration generated by the haptic module 154 are controllable. For instance, different vibrations can be outputted in a manner of being synthesized together or can be outputted in sequence.

The haptic module 154 is able to generate various tactile effects as well as the vibration. For instance, the haptic module 154 generates the effect attributed to the arrangement of pins vertically moving against a contact skin surface, the effect attributed to the injection/suction power of air though an injection/suction hole, the effect attributed to the skim over a skin surface, the effect attributed to the contact with electrode, the effect attributed to the electrostatic force, the effect attributed to the representation of hold/cold sense using an endothermic or exothermic device and the like.

The haptic module 154 can be implemented to enable a user to sense the tactile effect through a muscle sense of finger, arm or the like as well as to transfer the tactile effect through a direct contact. Optionally, at least two haptic modules 154 can be provided to the mobile terminal 100 in accordance with the corresponding configuration type of the mobile terminal 100.

The memory unit 160 is generally used to store various types of data to support the processing, control, and storage requirements of the mobile terminal 100. Examples of such data include program instructions for applications operating on the mobile terminal 100, contact data, phonebook data, messages, audio, still pictures (or photo), moving pictures, etc. And, a recent use history or a cumulative use frequency of each data (e.g., use frequency for each phonebook, each message or each multimedia) can be stored in the memory unit 160.

Moreover, data for various patterns of vibration and/or sound outputted in case of a touch input to the touchscreen can be stored in the memory unit 160.

The memory 160 may be implemented using any type or combination of suitable volatile and non-volatile memory or storage devices including hard disk, random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, multimedia card micro type memory, card-type memory (e.g., SD memory, XD memory, etc.), or other similar memory or data storage device. And, the mobile terminal 100 is able to operate in association with a web storage for performing a storage function of the memory 160 on Internet.

The interface unit 170 is often implemented to couple the mobile terminal 100 with external devices. The interface unit 170 receives data from the external devices or is supplied with the power and then transfers the data or power to the respective elements of the mobile terminal 100 or enables data within the mobile terminal 100 to be transferred to the external devices. The interface unit 170 may be configured using a wired/wireless headset port, an external charger port, a wired/wireless data port, a memory card port, a port for coupling to a device having an identity module, audio input/output ports, video input/output ports, an earphone port and/or the like.

The identity module is the chip for storing various kinds of information for authenticating a use authority of the mobile terminal 100 and can include User Identify Module (UIM), Subscriber Identify Module (SIM), Universal Subscriber Identity Module (USIM) and/or the like. A device having the identity module (hereinafter called 'identity device') can be manufactured as a smart card. Therefore, the identity device is connectible to the mobile terminal 100 via the corresponding port.

When the mobile terminal 110 is connected to an external cradle, the interface unit 170 becomes a passage for supplying the mobile terminal 100 with a power from the cradle or a passage for delivering various command signals inputted from the cradle by a user to the mobile terminal 100. Each of the various command signals inputted from the cradle or the power can operate as a signal enabling the mobile terminal 100 to recognize that it is correctly loaded in the cradle.

The controller 180 typically controls the overall operations of the mobile terminal 100. For example, the controller 180 performs the control and processing associated with voice calls, data communications, video calls, etc. The controller 180 may include a multimedia module 181 that provides multimedia playback. The multimedia module 181 may be configured as part of the controller 180, or implemented as a separate component.

Moreover, the controller 180 is able to perform a pattern (or image) recognizing process for recognizing a writing input and a picture drawing input carried out on the touchscreen as characters or images, respectively.

The power supply unit 190 provides power required by the various components for the mobile terminal 100. The power may be internal power, external power, or combinations thereof.

Various embodiments described herein may be implemented in a computer-readable medium using, for example, computer software, hardware, or some combination thereof.

For a hardware implementation, the embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. Such embodiments may also be implemented by the controller 180.

For a software implementation, the embodiments described herein may be implemented with separate software modules, such as procedures and functions, each of which perform one or more of the functions and operations described herein. The software codes can be implemented with a software application written in any suitable programming language and may be stored in memory such as the memory 160, and executed by a controller or processor, such as the controller 180.

Figure 2A:
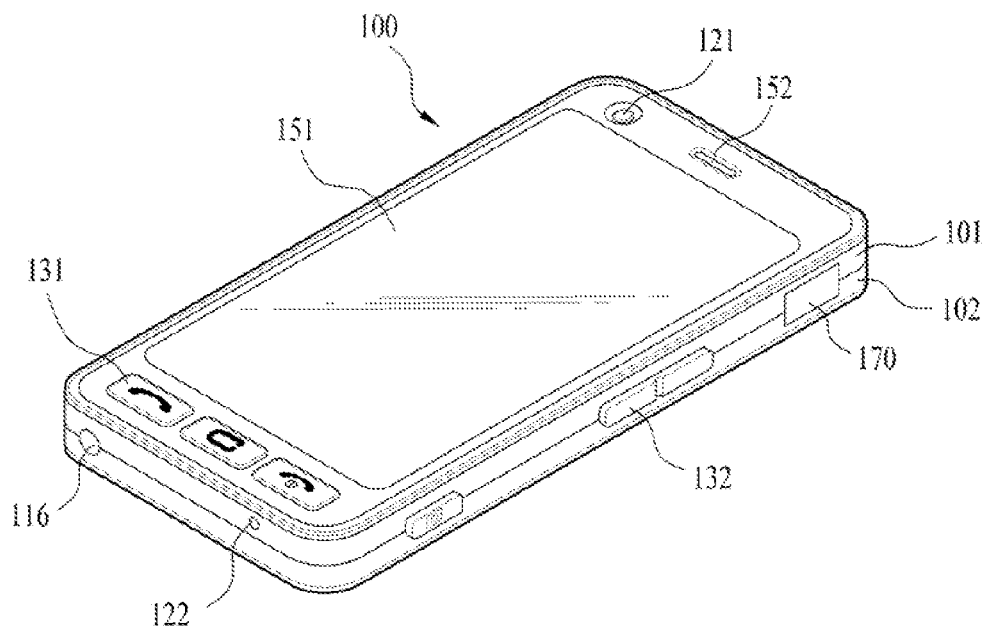
FIG. 2A is a front perspective diagram of a mobile terminal according to one embodiment of the present invention.

FIG. 2A is a front perspective diagram of a mobile terminal according to one embodiment of the present invention.

The mobile terminal 100 shown in the drawing has a bar type terminal body. Yet, the mobile terminal 100 may be implemented in a variety of different configurations. Examples of such configurations include folder-type, slide-type, rotational-type, swing-type and combinations thereof. For clarity, further disclosure will primarily relate to a bar-type mobile terminal 100. However such teachings apply equally to other types of mobile terminals.

The body includes a case (101, 102, 103) configuring an exterior thereof. In the present embodiment, the case can be divided into a front case 101 and a rear case 102. Various electric/electronic parts are loaded in a space provided between the front and rear cases 101 and 102. And, at least one middle case may be further provided between the front case 101 and the rear case 102.

The cases 101, 102 and 103 are formed by injection molding of synthetic resin or can be formed of metal substance such as stainless steel (STS), titanium (Ti) or the like for example.

A display 151, an audio output unit 152, a camera 121, user input units 130/131 and 132, a microphone 122, an interface 180 and the like can be provided to the terminal body, and more particularly, to the front case 101.

The display 151 occupies most of a main face of the front case 101. The audio output unit 152 and the camera 121 are provided to an area adjacent to one of both end portions of the display 151, while the user input unit 131 and the microphone 122 are provided to another area adjacent to the other end portion of the display 151. The user input unit 132 and the interface 170 can be provided to lateral sides of the front and rear cases 101 and 102.

The input unit 130 is manipulated to receive a command for controlling an operation of the terminal 100. And, the input unit 130 is able to include a plurality of manipulating units 131 and 132. The manipulating units 131 and 132 can be named a manipulating portion and may adopt any mechanism of a tactile manner that enables a user to perform a manipulation action by experiencing a tactile feeling.

Content inputted by the first or second manipulating unit 131 or 132 can be diversely set. For instance, such a command as start, end, scroll and the like is inputted to the first manipulating unit 131. And, a command for a volume adjustment of sound outputted from the audio output unit 152 and the like can be inputted to the second manipulating unit 132, a command for a switching to a touch recognizing mode of the display 151 and the like can be inputted to the second manipulating unit 132.

Figure 2B:
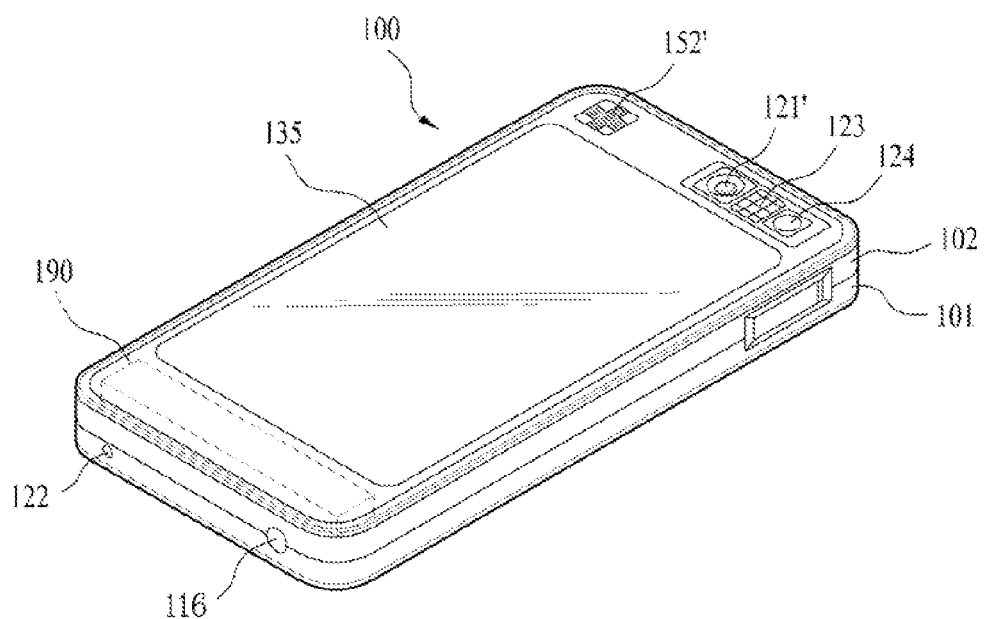
FIG. 2B is a rear perspective diagram of a mobile terminal according to one embodiment of the present invention.

FIG. 2B is a perspective diagram of a backside of the terminal shown in FIG. 2A.

Referring to FIG. 2B, a camera 121' can be additionally provided to a backside of the terminal body, and more particularly, to the rear case 102. The camera 121 has a photographing direction that is substantially opposite to that of the former camera 121 shown in FIG. 2A and may have pixels differing from those of the firmer camera 121.

Preferably, for instance, the former camera 121 has low pixels enough to capture and transmit a picture of user's face for a video call, while the latter camera 121' has high pixels for capturing a general subject for photography without transmitting the captured subject. And, each of the cameras 121 and 121' can be installed at the terminal body to be rotated or popped up.

A flash 123 and a mirror 124 are additionally provided adjacent to the camera 121'. The flash 123 projects light toward a subject in case of photographing the subject using the camera 121'. In case that a user attempts to take a picture of the user (self-photography) using the camera 121', the mirror 124 enables the user to view user's face reflected by the mirror 124.

An additional audio output unit 152' can be provided to the backside of the terminal body. The additional audio output unit 152' is able to implement a stereo function together with the former audio output unit 152 shown in FIG. 2AA and may be used for implementation of a speakerphone mode in talking over the terminal.

A broadcast signal receiving antenna 116 can be additionally provided to the lateral side of the terminal body as well as an antenna for communication or the like. The antenna 116 constructing a portion of the broadcast receiving module 111 shown in FIG. 1 can be retractably provided to the terminal body.

A power supply unit 190 is provided to the terminal body to supply a power to the mobile terminal 100. In particular, the power supply unit 190 may be built in the terminal body. Alternatively, the power supply unit 190 may be configured to be attached in direct to the terminal body detachably and externally.

A touchpad 135 may be additionally provided to the rear case 102 to detect a touch. And, the touchpad 135 may have light-transmittive configuration for the display unit 151. In this case, if the display unit 151 is configured to output visual information through both sides of its own (i.e., in directions of both a front side and a rear side of the mobile terminal), the visual information is recognizable through the touchpad 135 as well. And, the information outputted through both of the sides may be controlled by the touchpad 135.

Meanwhile, as a display dedicated to the touchpad 135 is separately installed, a touchscreen can be arranged on the rear case 102 as well.

The touchpad 135 operates in mutual association with the display unit 151 of the front case 101. The touchpad 135 can be arranged in rear of the display unit 151 side by side. And, the above-mentioned touchpad 135 may have a size equal to or smaller than that of the display unit 151.

In the following description, embodiments relating to a controlling method implemented in the above-configured mobile terminal shall be explained with reference to the accompanying drawings.

Figure 3:
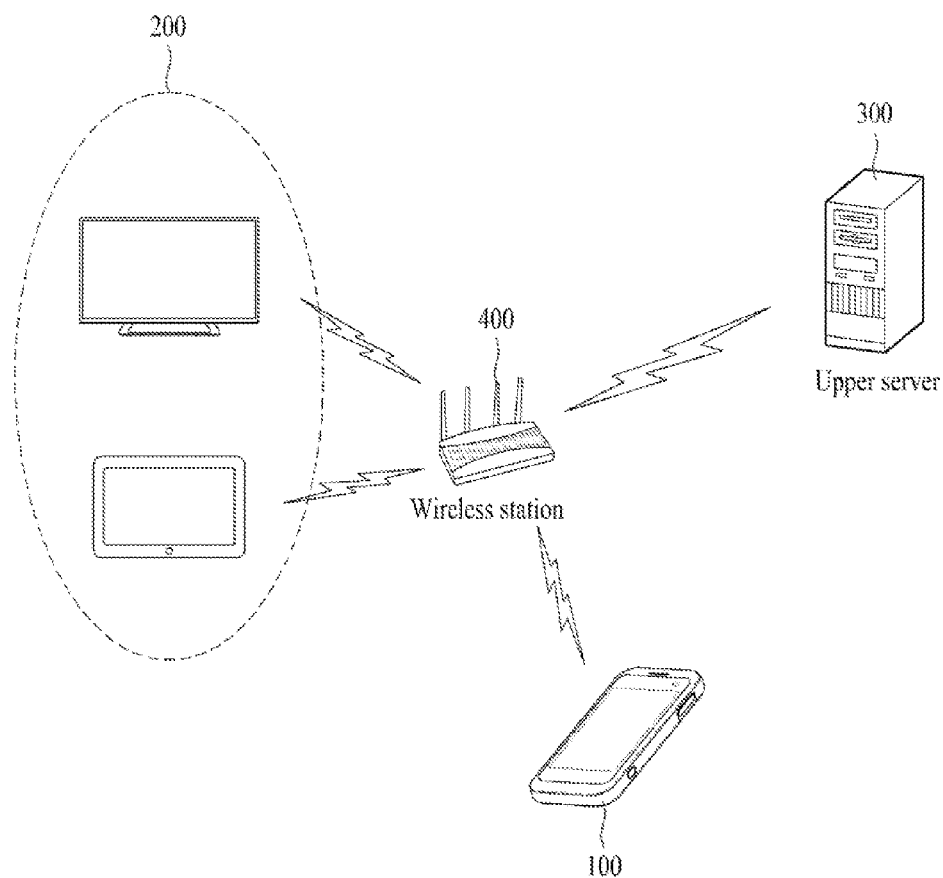
FIG. 3 is a schematic diagram of a location based device map configuring system using a mobile terminal 100 according to the present invention.

FIG. 3 is a schematic diagram of a location based device map configuring system using a mobile terminal 100 according to the present invention. Referring to FIG. 3, a device map configuring system according to the present invention may include a mobile terminal 100, a neighbor terminal 200 and an upper server 300 configured to collect location informations from the mobile terminal 100 and the neighbor terminal 200 and store the saved location informations.

The neighbor terminal 200 is a device configured to receive data from the mobile terminal 100 by being connected to the mobile terminal 100 and transmit data to the mobile terminal 100 by being connected thereto. The neighbor terminal 200 periodically (or aperiodically) communicates with the upper server 300 and is then able to provide its location to the upper server 300.

The upper server 300 collects location informations from the mobile terminal 100 and the neighbor terminal 200 and is then able to provide the mobile terminal with information on the neighbor terminal 200 located at the same place of the mobile terminal 100 based on the collected location informations. The upper server 300 may determine that the neighbor terminal 200 accessing a same wireless station 400 of the mobile terminal 100 is located at the same place of the mobile terminal 100. Moreover, the upper server 300 may control a place image, which matches the mobile terminal located place, to be provided to the mobile terminal 100.

The mobile terminal 100 receives the information on the neighbor terminal 200 and the place image from the upper server 300 and then creates a device map based on the received information. In this case, the device map is configured to display the neighbor terminal 200 located at the same place of the mobile terminal 100. If one of neighbor terminals 200 displayed on the device map is selected, the mobile terminal 100 and the selected neighbor terminal 200 can be connected to each other. Yet, it may be unnecessary for the mobile terminal 100 to receive the information on the neighbor terminal from the upper server 300 all the time. For instance, the mobile terminal 100 may receive the neighbor terminal information directly from the corresponding neighbor terminal 200.

In the following description, a process for organic operations of the above-mentioned components is explained in detail with reference to the operational flowchart shown in FIG. 4.

Figure 4:
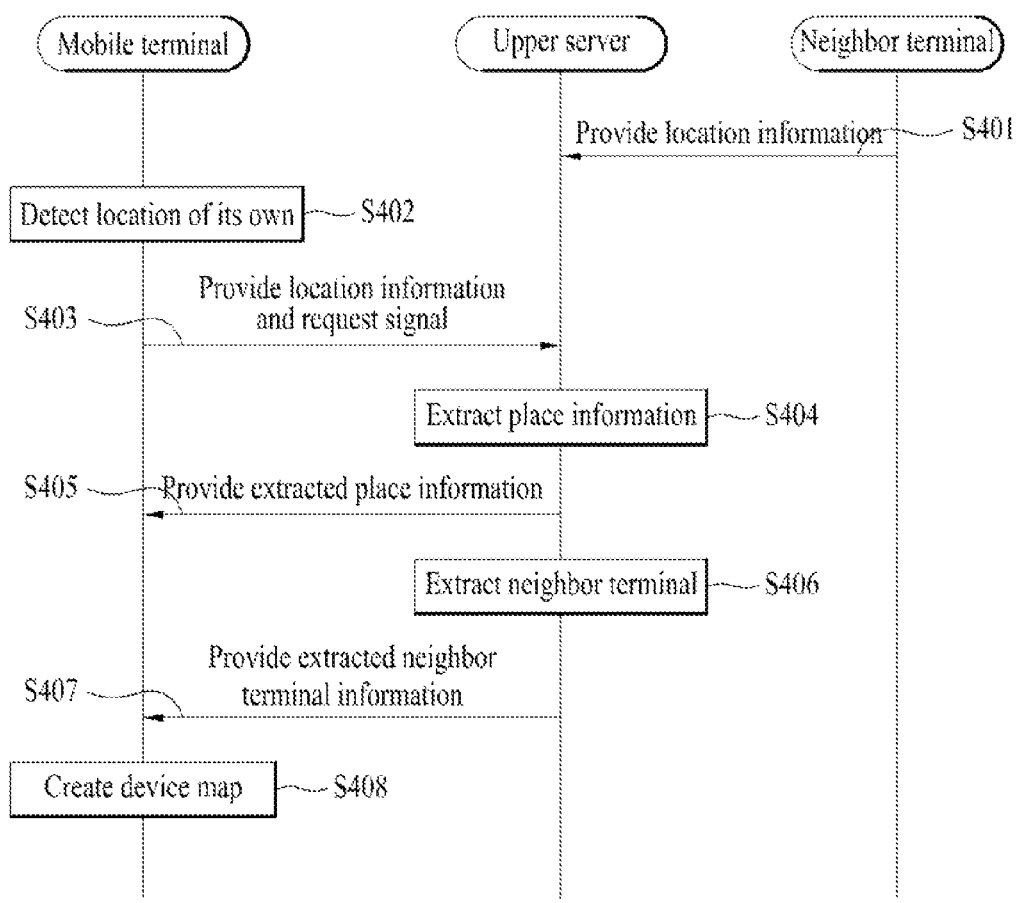
FIG. 4 is a flowchart for an operation of a location based device map configuring system using a mobile terminal according to the present invention.

FIG. 4 is a flowchart for an operation of a location based device map configuring system using the mobile terminal 100 according to the present invention. Referring to FIG. 4, the upper server 300 can collect location information of the neighbor terminal 200 periodically (or aperiodically) [S401]. In other words, the neighbor terminal 200 can provide its location information to the upper server 300 periodically (or aperiodically). In doing so, the neighbor terminal 200 may obtain location information by triangulation using GPS, WPS or a base station. The collected information may be saved as a location database in the upper server 300. As a database of the collected location information is created, it is able to enhance efficiency in data search and update. Yet, in order for the upper server 300 to provide the neighbor terminal information to the mobile terminal 100, each of the neighbor terminal 200 and the mobile terminal 100 should agree to providing its location information to the upper server 300. In particular, the upper server 300 may collect the neighbor terminal information from the neighbor terminal 200 having granted the authentication for the device map configuration. Subsequently, if a device map creation request signal is applied to the mobile terminal 100 through an external input, the mobile terminal 100 can detect its location through the position location module 115 [S402]. In case of detecting its location, the mobile terminal 100 transmits the detected location to the upper server 300 and is also able to transmit a request signal for requesting a place image and a neighbor terminal information to create a device map [S403]. The upper server 300 extracts a place image, which matches the mobile terminal's location received from the mobile terminal 100, from a place image database [S404] and is then able to provide the extracted place image to the mobile terminal 100 [S405]. In this case, the place image may include a map image corresponding to the location of the mobile terminal 100, a photographed (or picture) image of a surrounding environment of the mobile terminal 100, or a blueprint/photographed (picture) image of a place or building at which the mobile terminal 100 is located. For instance, if the mobile terminal 100 is located at an art museum, at least one of the images exemplarily shown in FIGS. 5 (*a*) to 5 (*c*) can be provided to the mobile terminal 100.

Figure 5:
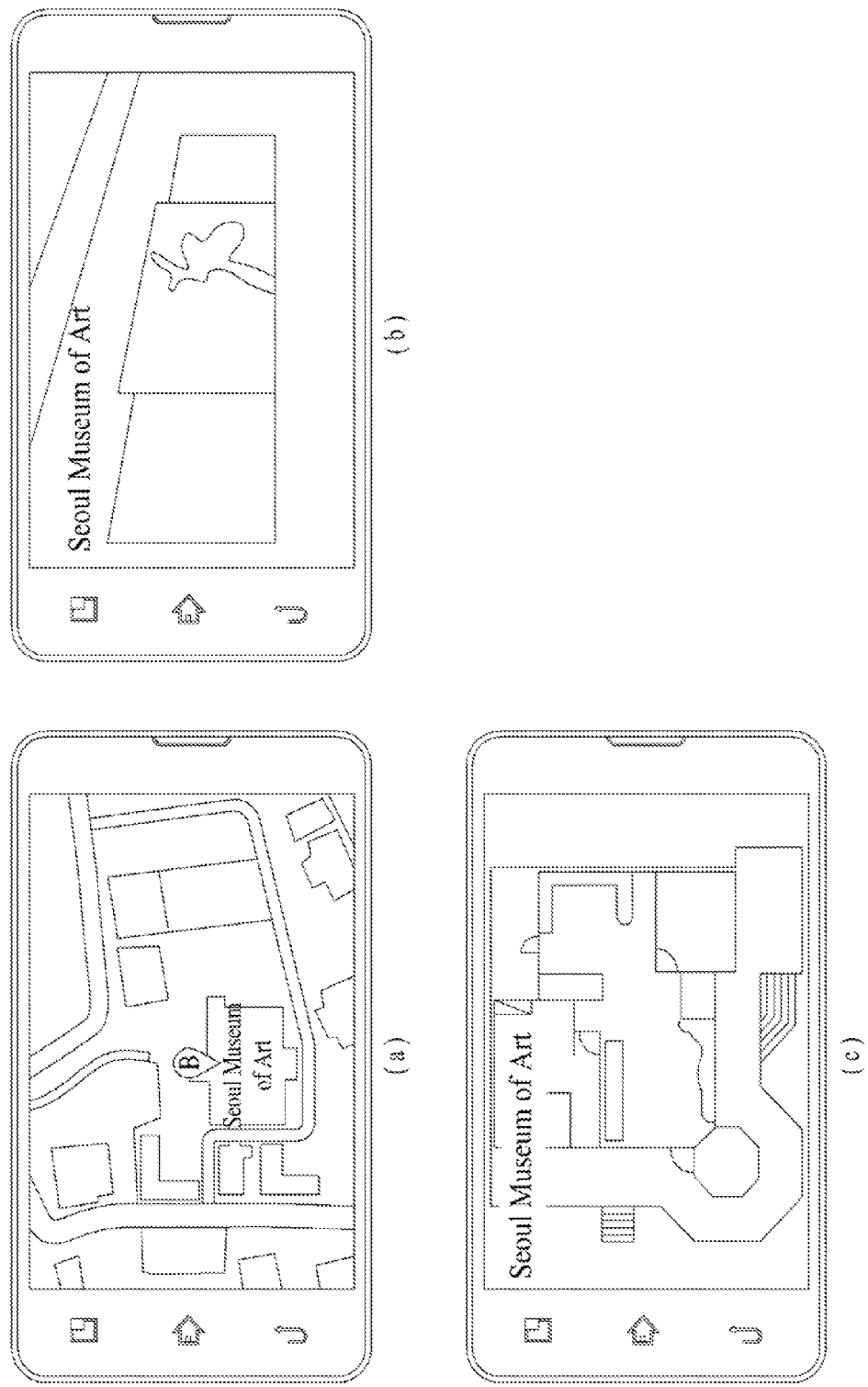
FIGS. 5 (a) to 5 (c) are diagrams for one example of a place image provided to a mobile terminal.

FIGS. 5 (*a*) to 5 (*c*) are diagrams for one example of a place image provided to the mobile terminal 100. Referring to FIG. 5 (*a*), the upper server 300 can provide the mobile terminal 100 with a map image, which displays a location of an art museum, as a place image. Alternatively, referring to FIG. 5 (*b*), the upper server 300 can provide a photographed image of an inside of the art museum as the place image. Alternatively, referring to FIG. 5 (*c*), the upper server 300 can provide a blueprint of the art museum as the place image.

Subsequently, the upper server 300 can extract the neighbor terminal 200, which is located at the same place of the mobile terminal 100, from the location information database [S406]. If the neighbor terminal 200 located at the same place of the mobile terminal 100 is extracted, the upper server 300 can provide the mobile terminal 100 with a neighbor terminal information on the neighbor terminal 200 [S407]. In this case, the neighbor terminal information may include at least one of a location information (or a 3-dimensional location information) of the neighbor terminal, a type information of the neighbor terminal, an information on a service provided by the neighbor terminal 200, a network support information of the neighbor terminal 200, a security related authentication information, a spaced distance between the neighbor terminal 200 and the mobile terminal, and an address (e.g., IP/MAC address) of the neighbor terminal 200.

Having received the neighbor terminal information, the mobile terminal 100 can create a device map in which the neighbor terminal 200 is displayed on the place image received from the upper server 300 [S408]. In particular, the mobile terminal 100 displays a location of the neighbor terminal 200 on the place image, thereby controlling the device map to be created. If the device map is provided, a user can be provided with a list of the neighbor terminals 200 neighboring to the mobile terminal 100. Moreover, by connecting the mobile terminal 100 and the neighbor terminal 200 to each other, data is received from the neighbor terminal 200 or data stored in the mobile terminal 100 is provided to the neighbor terminal 200. Therefore, the neighbor terminal 200 can be further utilized.

Yet, it may be unnecessary for an accurate location of the neighbor terminal 200 to be displayed on the device map. It is enough for the neighbor terminal 200 to be simply displayed on the image provided as the place image of the neighbor terminal 200. Thus, it is not mandatory for the accurate location of the neighbor terminal 200 to be displayed. The step of receiving the place image can be skipped if necessary. In case that the place image receiving step is skipped, the mobile terminal 100 creates a device map using an image previously saved in the memory 160 or may create a device map using a black and white screen as a background. Although FIG. 4 shows one example that the mobile terminal 100 obtains the place image from the upper server 300, it may be unnecessary for the place image to be obtained from the upper server 300. For instance, the mobile terminal 100 can obtain the place image from the neighbor terminal 200 or a wireless station (e.g., an AP, a base station, a femto cell, etc.) connected to the mobile terminal 100. In case that the neighbor terminal 200 is located at the same building of the mobile terminal 100, in an administrative district of the mobile terminal 100, on the same road of the mobile terminal 100, or within a range of a prescribed radius of the mobile terminal 100, the upper server 300 may determine that the neighbor terminal 200 is located at the same place of the mobile terminal 100.

Moreover, in case that the mobile terminal 100 or the neighbor terminal 200 is located in an indoor space, since a reception rate of a GPS signal is lowered, it is possible for a location of the mobile terminal 100 or the neighbor terminal 200 to be determined inaccurately. In this case, the upper server 300 can determine that the neighbor terminal 200 belonging to the same network cell (or coverage) of the mobile terminal 100 is located at the same place of the mobile terminal 100. In particular, in case that the neighbor terminal 200 accesses the same AP, base station or femto cell of the mobile terminal 100, the upper server 300 can determine that each of the mobile terminal 100 and the neighbor terminal 200 belongs to the same network cell (or coverage). In particular, the upper server 300 can determine whether the mobile terminal 100 and the neighbor terminal 200 belong to the same network cell (or coverage) by unit of such a wireless station as an AP, a base station, a femto cell and the like.

Figure 6:
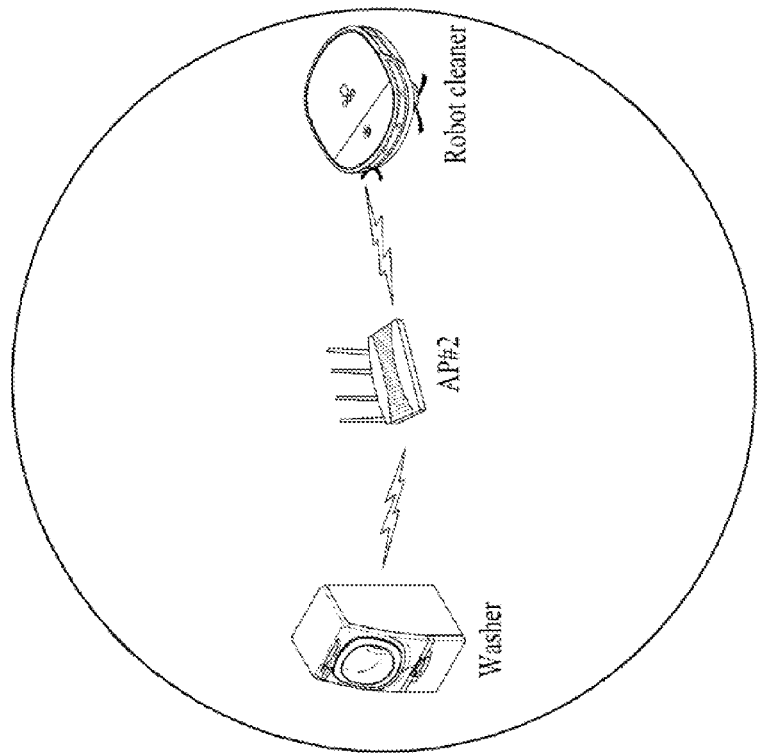
FIG. 6 is a diagram for one example to describe a neighbor terminal belonging to the same network cell of a mobile terminal.
Figure 6:
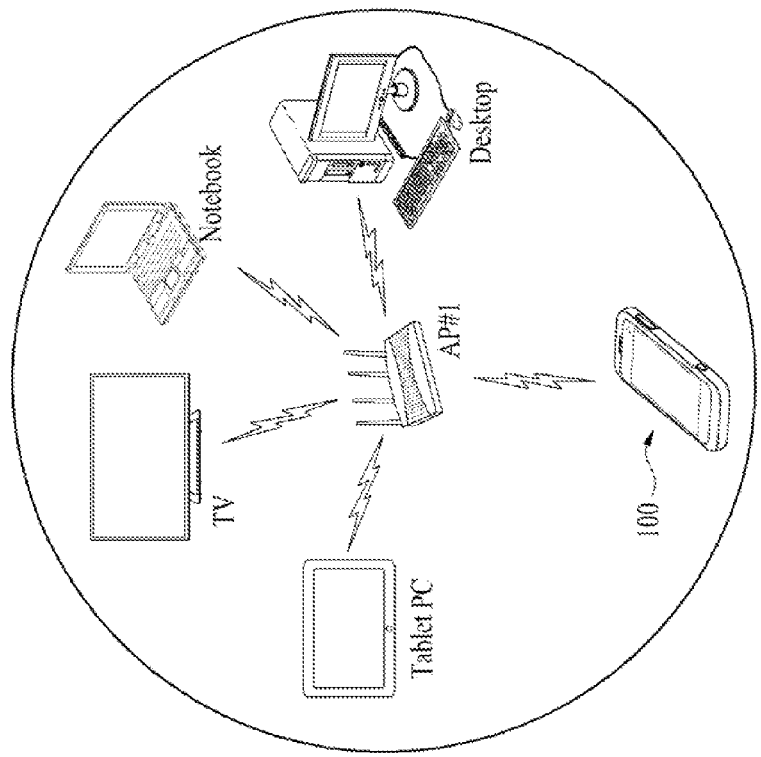

FIG. 6 is a diagram for one example to describe a neighbor terminal 200 belonging to the same network cell of a mobile terminal 100. Referring to FIG. 6, assume that the mobile terminal 100 has been connected to an AP #1 already. In doing so, such a device currently connected to the same AP (i.e., AP #1) of the mobile terminal 100 as a TV, a notebook PC, a tablet PC, a desktop PC and the like can be described as the neighbor terminal 200 belonging to the same network cell of the mobile terminal 100. Namely, if the mobile terminal 100 and the neighbor terminal 200 belong to different APs, respectively, they may not be regarded as located at the same place.

In particular, in the embodiment shown in FIG. 6, the TV and notebook currently connected to the same AP (AP #1) of the wireless communication unit 110 can be determined as belonging to the same network cell of the wireless communication unit 110. On the contrary, such a device currently connected to an AP (e.g., AP #2) different from that of the wireless communication unit 110 as a washer, a robot cleaner and the like cannot be regarded as the neighbor terminal 200 belonging to the same network cell of the wireless communication unit 110.

In the example shown in FIG. 6, if an access point of the mobile terminal 100 is changed into the AP #2 from the AP #1, the neighbor terminal 200 determined as located at the same place of the mobile terminal 100 may be changed into the washer, the robot cleaner or the like.

The upper server 300 compares an address information of the neighbor terminal 200, which is received from the neighbor terminal 200, to an address information of the mobile terminal 100, thereby determining whether the mobile terminal 100 and the neighbor terminal 200 belong to the same network cell.

Although FIG. 4 shows one example that the process (i.e., the step S406 and the step S407) for providing the neighbor terminal information is performed after completion of the process (i.e., the step S404 and the step S405) for providing the place image, it may be unnecessary for the processes to be performed in order shown in the drawing. For instance, it is a matter of course that the place image providing process can be performed after completion of the neighbor terminal information providing process. For another instance, both of the place image providing process and the neighbor terminal information providing process can be simultaneously performed.

In the following description, the mobile terminal 100 shown in FIG. 3 and FIG. 4 is explained in detail. For clarity of the following description, assume that the mobile terminal 100 mentioned in the following description includes at least one portion of the components shown in FIG. 1. In particular, the mobile terminal 100 mentioned in the following description may include the wireless communication unit 110, the user input unit (or display unit) 151, the memory 160 and the controller 180 among the components shown in FIG. 1.

In the following description, the mobile terminal 100 according to the present invention is explained in detail with reference to the operational flowchart shown in FIG. 7. Yet, it may be unnecessary for all the steps shown in FIG. 7 to be performed. For instance, at least one portion of the steps shown in FIG. 7 can be skipped.

Figure 7:
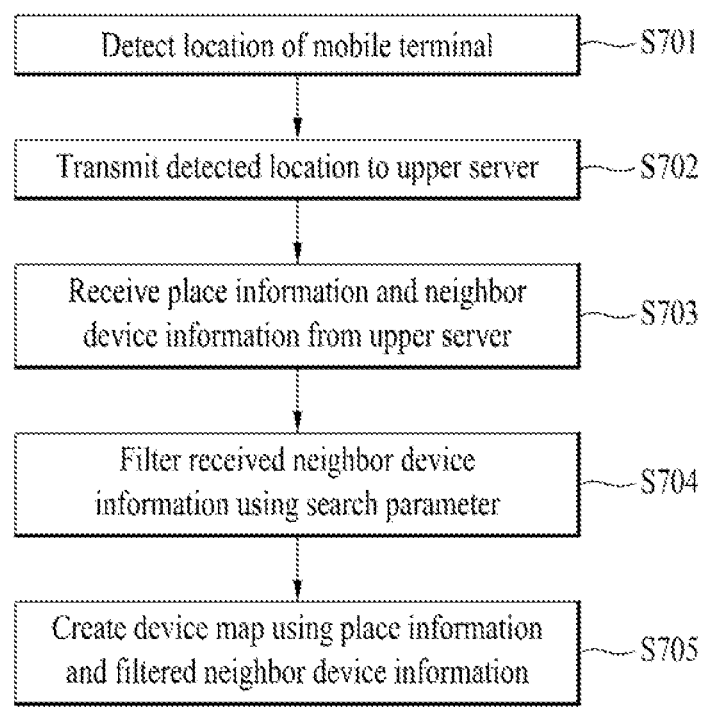
FIG. 7 is a flowchart for an operation of a mobile terminal according to one embodiment of the present invention.

FIG. 7 is a flowchart for an operation of a mobile terminal 100 according to one embodiment of the present invention. Referring to FIG. 7, if a device map creating request signal is applied to the mobile terminal 100 through an external input, the controller 180 activates the position location module 115 included in the wireless communication unit 110 and is then able to control a location of the mobile terminal 100 to be detected [S701]. The position location module 115 obtains the location of the mobile terminal 100 by GPS (global positioning system), WPS (Wi-Fi positioning system) and/or BS (base station) triangulation. Alternatively, the mobile terminal 100 can be provided with location information through a server (e.g., LBSP) provided by IPS (internet service provider) or a device equivalent to a server.

If the location of the mobile terminal 100 is detected through the position location module 115, the controller 180 can transmit a location information of the mobile terminal 100 to the upper server 300 through a wireless communication network [S702]. Together with the location information, the controller 180 can transmit a request signal for requesting to provide a place image corresponding to the location of the mobile terminal 100 and an information on a neighbor terminal located at the same place of the mobile terminal 100 through the wireless communication network as well. Subsequently, if the place image and the neighbor terminal information are received from the upper server 300 through the wireless communication unit 110 [S703], the controller 180 saves the received place image and the received neighbor terminal information in the memory 160 and is then able to filter the received neighbor terminal information using a search parameter [S704].

In this case, the search parameter is utilized as a factor for selecting a neighbor terminal 200 actually desired by a user and may include a determined category of a terminal to search for. And, the search parameter may be changed based on a user input.

Figure 8:
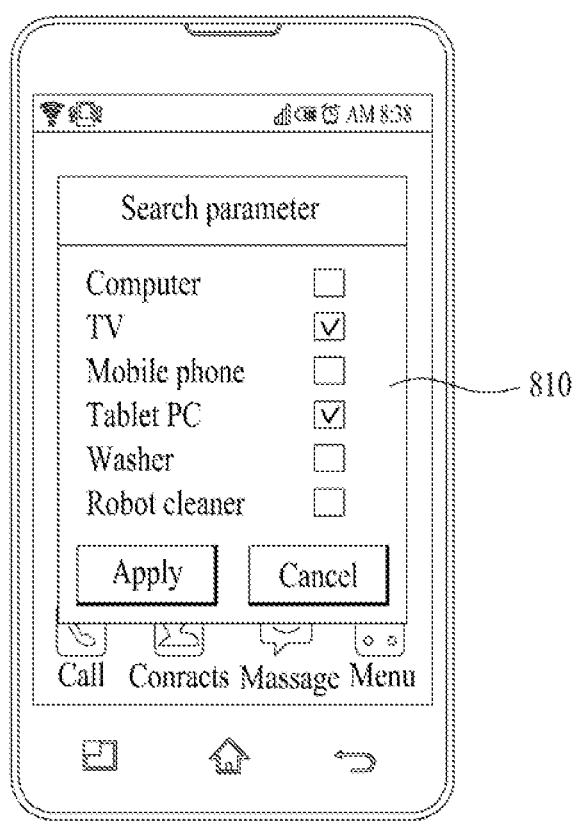
FIG. 8 is a diagram for one example of a screen provided to a user to designate a terminal category as a search parameter.

The search parameter may include a designation of a type of the neighbor terminal 200, a designation of a communication system supported by the neighbor terminal 200, or a designation of a spaced distance between the neighbor terminal 200 and the mobile terminal 100. For example, FIG. 8 is a diagram for one example of a screen provided to a user to designate a terminal category as a search parameter. Referring to FIG. 8, in order to designate a terminal category as a search parameter, the controller 180 can control a popup window 810, on which terminal categories to be searched are enumerated, to be displayed through the display unit 151. In FIG. 8, a computer, a TV, a mobile phone, a tablet PC, a washer, a robot cleaner and the like are enumerated as the terminal categories that can be designated as search parameters, which are the examples for clarity of the description only. And, the present invention may be non-limited by the items enumerated in FIG. 8. In addition to the devices shown in FIG. 8, it is a matter of course that various kinds of electronic devices including a refrigerator, a navigation device, an illumination device, a printer and the like can be set as the search parameters. The controller 180 sets a user-selected category as the search parameter and is then able to set it in the memory 160 (e.g., TV and tablet PC are selected in FIG. 8).

For instance, if the neighbor terminal types received from the upper server 300 include the mobile phone, the TV, the notebook and the tablet PC, the controller 180 can extract informations on the TV and tablet included in the scope of the TV and tablet PC designated as the search parameters shown in FIG. 8 from the received neighbor device information. Suing the search parameter, a user can easily and conveniently determine whether an electronic device desired by the user is located nearby and is able to control an actually necessary information to be displayed on the device map only.

If the search parameter relates to the communication system supported by the neighbor terminal 200, the controller 180 can extract the neighbor terminal 200, which uses the communication system designated as the search parameter, from the received neighbor device information. For instance, if the communication system designated as the search parameter is Wi-Fi, the controller 180 can extract an item supportive of the Wi-Fi communication from the neighbor device information.

For another instance, if the search parameter relates to the spaced distance between the neighbor terminal 200 and the mobile terminal 100, the controller 180 can extract the neighbor terminal 200 located in the spaced distance designated as the search parameter from the received neighbor device information. For example, if the spaced distance designated as the search parameter is set to a range of 50 m, the controller 180 can extract an item, which is recognized as located in a radius of 50 m centering on the mobile terminal 100, from the neighbor device information. Referring now to FIG. 7, based on the extracted neighbor terminal information, the controller 180 creates a device map and then saves it in the memory 160 [S705]. And, the controller 180 can control the display unit 151 to display the created device map. In this case, the device map is provided to display the neighbor terminal 200 belonging to the same place of the mobile terminal 100. A user selects the neighbor terminal 200 displayed on the device map and is then able to connect the mobile terminal 100 and the selected neighbor terminal 200 to each other.

In particular, the controller 180 can create the device map using the neighbor terminal information extracted in the step S704 and the place image received in the step S703. In the following description, the device map is explained in detail with reference to the example shown in FIG. 9.

Figure 9:
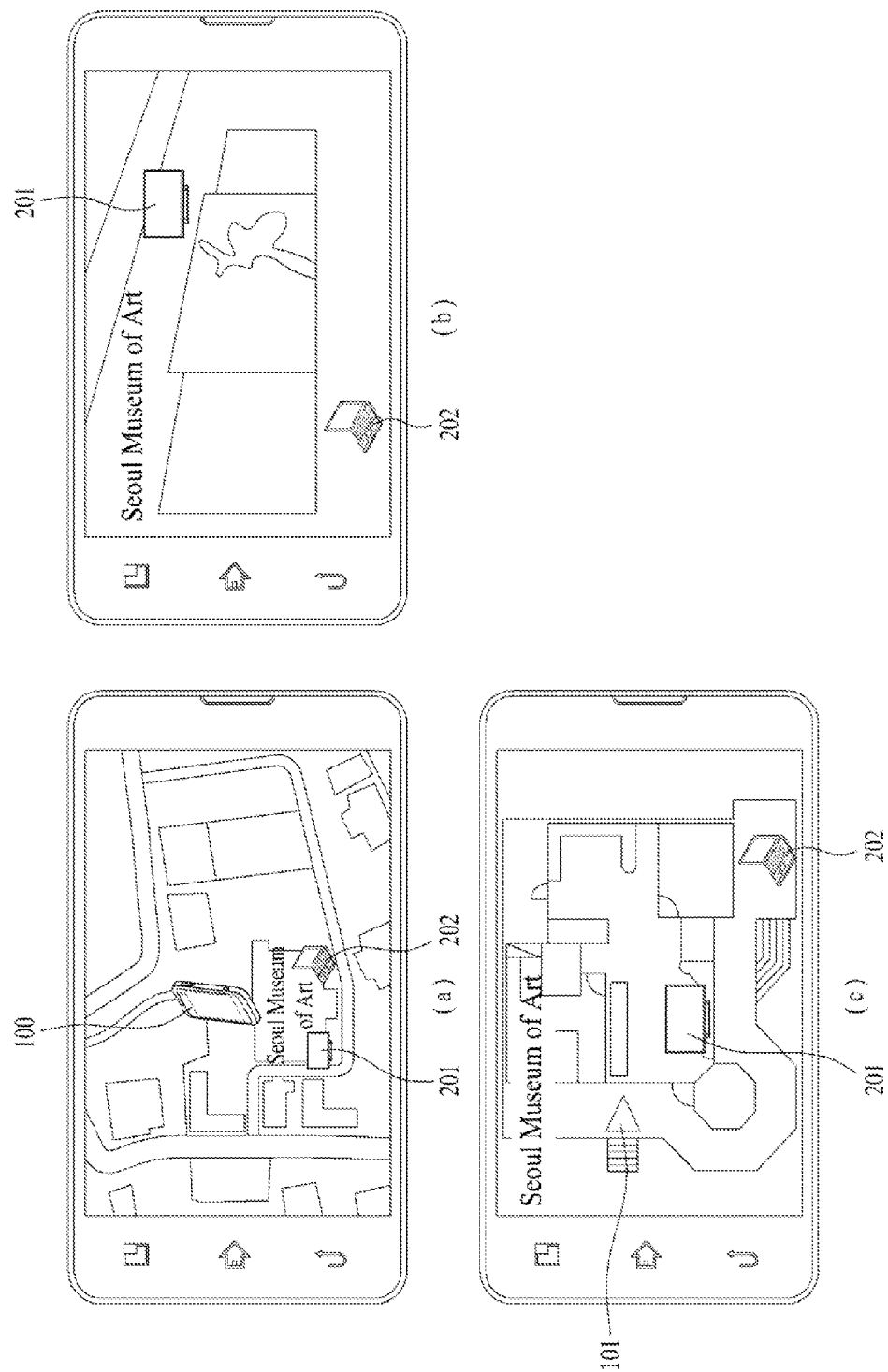
FIGS. 9 (a) to 9 (c) are diagrams for one example of a device map displayed through a mobile terminal.

FIGS. 9 (*a*) to 9 (*c*) are diagrams for one example of the device map displayed through the mobile terminal 100. As mentioned in the foregoing description with reference to FIG. 5, the controller 180 can create the device map based on the place image received from the upper server 300. As mentioned in the foregoing description, FIGS. 9 (*a*) to 9 (*c*) show that the device maps are created based on the map image for example of the place image, the image for the surrounding environment of the mobile terminal 100 and the blueprint of the mobile terminal located place, respectively.

Referring to FIGS. 9 (a) to 9 (c), the controller 180 can control the neighbor terminal 200 to be displayed on the place image (e.g., in the examples shown in FIGS. 9 (a) to 9 (c), the neighbor terminals 200 include a TV 201 and a notebook 202). In doing so, referring to FIGS. 9 (a) to 9 (c), the controller 180 can control the neighbor terminal 200 to be displayed through an icon. Moreover, referring to FIG. 9 (a), the controller 180 can control a location of the mobile terminal 100 to be displayed on the device map together with the neighbor terminal 200. Yet, it is not mandatory for the location of the mobile terminal 100 to be displayed and the location of the mobile terminal 100 may be omitted by user settings. For example, referring to FIG. 9 (b), the controller 180 can control the location of the mobile terminal 100 not to be displayed on the device map.

In case that both of the locations of the mobile terminal 100 and the neighbor terminal 200 are displayed on the device map simultaneously, the controller 180 can control the locations of the mobile terminal 100 and the neighbor terminal 200 to be displayed on the device map in a manner of being visually discriminated from each other. For example, referring to FIG. 9 (c), the controller 180 can control the locations of the mobile terminal 100 and the neighbor terminal 200 to be visually discriminated from each other in a manner that the locations of the mobile terminal 100 and the neighbor terminal 200 are displayed as a cursor 101 and an icon, respectively. This, the reason why the locations of the mobile terminal 100 and the neighbor terminal 200 are visually discriminated from each other is to prevent the mobile terminal 100 displayed on the device map from being confused with the neighbor terminal 200.

Using the location information of the neighbor terminal 200, which is included in the neighbor terminal information, the controller 180 can display the location of the neighbor terminal 200 on the place image. Yet, in case that the location information is not included in the neighbor terminal information, the controller 180 can control the mobile terminal 100 to be randomly displayed.

Although the mobile terminal 100 creates the device map by receiving the neighbor terminal information from the upper server 300 in the former descriptions with reference to FIGS. 3 to 9, it may be unnecessary for the mobile terminal 100 to receive the neighbor terminal information from the upper server. For instance, in case that an A-hoc network not having such a based network device as a base station and an AP is configured between the mobile terminal 100 and the neighbor terminal 200, the controller 180 can directly receive the neighbor terminal information from the neighbor terminal 200. In doing so, the mobile terminal 100 receives the place image only from the upper server 300 and can be directly provided with the neighbor terminal information from the neighbor terminal 200.

Figure 10:
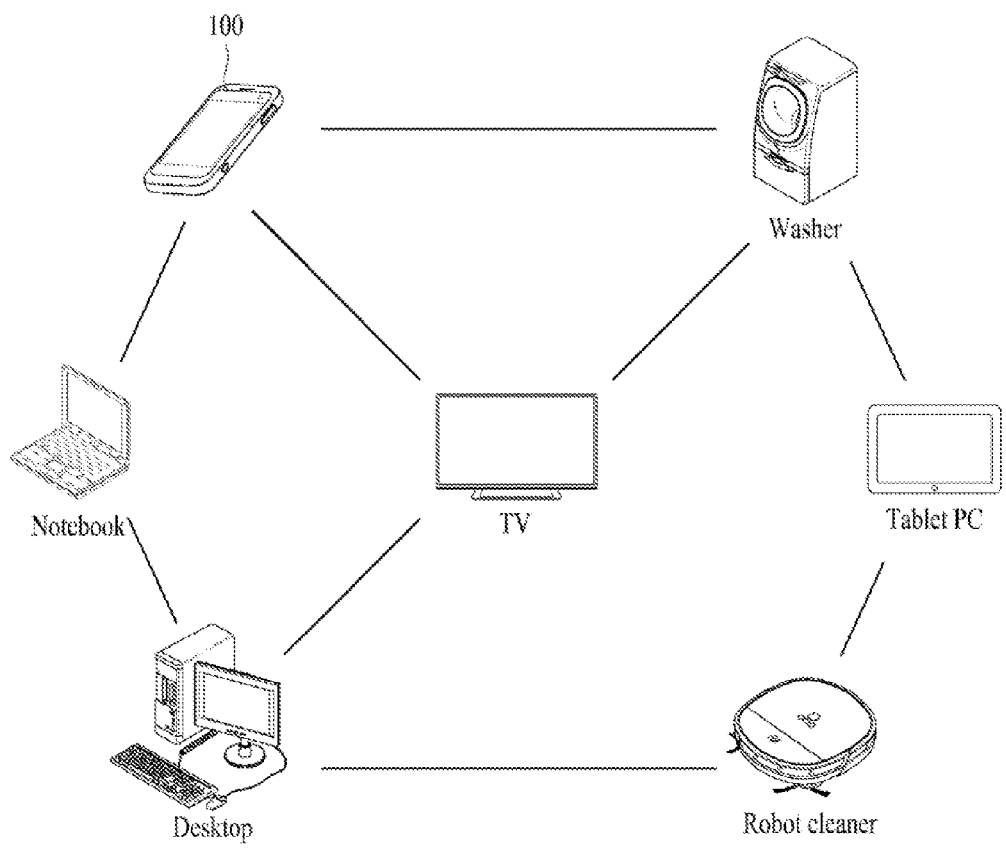
FIG. 10 is a diagram for one example of configuration of Ad-hoc network between a mobile terminal and a neighbor terminal.

FIG. 10 is a diagram for one example of configuration of the Ad-hoc network formed between the mobile terminal 100 and the neighbor terminal 200. Referring to FIG. 10, in case that the AD-hoc network is configured, the controller 180 of the mobile terminal 100 can broadcast a request signal for requesting a neighbor terminal information through the wireless communication unit 110. Each of the neighbor terminals 200 configuring the Ad-hoc network can provide the mobile terminal 100 with the neighbor terminal information based on the request signal from the mobile terminal 100. In FIG. 10, the mobile terminal 100 can be provided with the neighbor terminal information from each of a notebook, a desktop, a TV, a washer, a tablet PC, a robot cleaner and the like configuring the Ad-hoc network.

Subsequently, the controller 180 may create the device map based on the place image received from the upper server 300 and the neighbor terminal information received from the neighbor terminal 200.

In FIG. 7, it may be unnecessary to perform the step S704 of filtering the received neighbor device information using the search parameter. For instance, if all types of devices are designated as the search parameter, the step S704 can be skipped.

In FIG. 7, the controller 180 can provide the location of the mobile terminal 100 to the upper server 300 periodically (or aperiodically). In case of determining that the location of the mobile terminal 100 has been changed, the upper server 300 can provide the mobile terminal 100 with a place image corresponding to an updated location. Hence, each time the location of the mobile terminal 100 is changed, the controller 180 can update the device map.

Moreover, the mobile terminal 100 can receive the neighbor terminal information from the upper server 300 periodically (or aperiodically). Hence, the controller 180 updates the device map each time the neighbor terminal information is changed, thereby controlling the device map to display the neighbor terminal 200 by real time.

According to the description with reference to FIG. 7, the device map is displayed in a manner that the location of the neighbor terminal 200 is displayed on the place image received from the upper server 300. Yet, it may be unnecessary for the mobile terminal 100 to receive the place image from the upper server 300. For instance, if the place image is not received from the upper server 300, an image inputted to the camera can be used as the place image. In doing so, the controller 180 can control the location of the neighbor terminal 200 to be displayed using the augmented reality technology.

If at least one of the neighbor terminals 200 displayed on the device map is selected, the mobile terminal 100 can be connected to the selected neighbor terminal 200. In particular, the mobile terminal performs data communications with the neighbor terminal 200. Hence, the mobile terminal 100 can receive information provided by the neighbor terminal 200 or provide prescribed information to the neighbor terminal 200. In doing so, the mobile terminal 100 can perform the data communications with the neighbor terminal 200 through a neighbor terminal address (e.g., IP and/or MAC address) included in the neighbor terminal information.

The mobile terminal 100 receives an optimal service associated with a point at which the mobile terminal 100 is located (i.e., a network to which the mobile terminal 100 belongs) through the device map. For instance, if the mobile terminal 100 is located at an art museum, the mobile terminal 100 can be provided with information on the exhibited works of art by being connected to a computer operating in the art museum. For another instance, if the mobile terminal 100 is located at a bus terminal, the mobile terminal 100 can be provided with such a service as a bus schedule information, a bust ticket purchase and the like by being connected to a computer operating in the bus terminal. For another instance, if the mobile terminal 100 is located at home, the mobile terminal 100 can be used as a remote controller for controlling various electronic devices that configure a home network. In particular, the mobile terminal 100 according to the present invention creates a device map appropriate for a place at which the mobile terminal 100 is located and can have an advantage in providing a user with a service appropriate for the location of the mobile terminal 100.

In the following description, various embodiments using the above-described device map according to the present invention are explained in detail with reference to the accompanying drawings.

First Embodiment

If a prescribed neighbor terminal 200 is selected from a neighbor terminal list provided to a device map, the controller 180 can make a request for an access to the selected neighbor terminal 200 through the wireless communication unit 110. The mobile terminal 100 accesses the neighbor terminal 200 and is then able to read or modify a shared file shared with the neighbor terminal 200. Moreover, the mobile terminal 100 receives the shared file and is then able to save it in its memory 160. Furthermore, the mobile terminal 100 can utilize a cloud computing service using computing resources (e.g., software and hardware) provided by the neighbor terminal 200.

Figure 11:
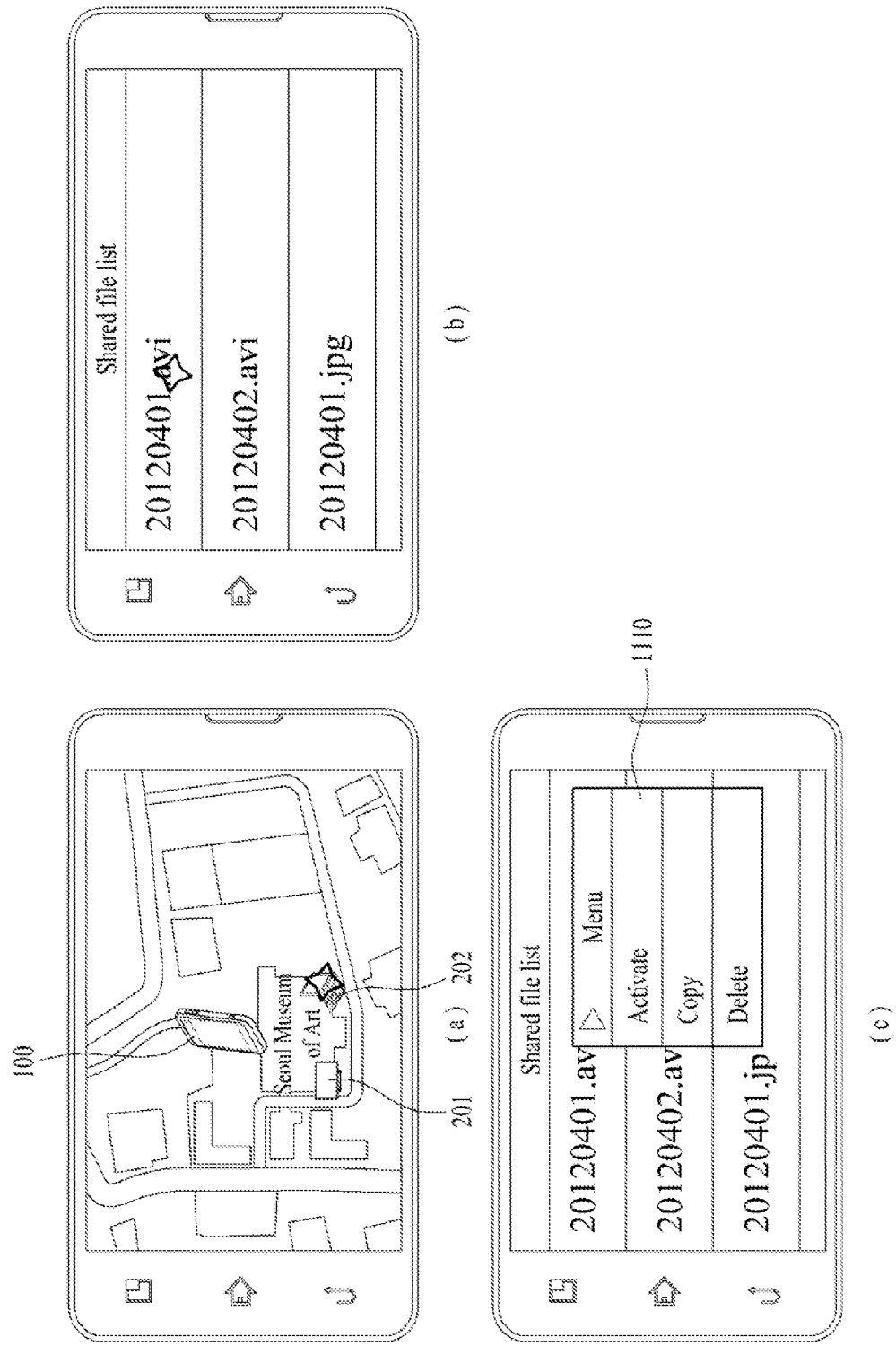
FIGS. 11 (a) to 11 (c) are diagrams for one example to describe a process for a mobile terminal to read a shared file shared with a neighbor terminal.

FIGS. 11 (a) to 11 (c) are diagrams for one example to describe a process for a mobile terminal 100 to read a shared file shared with a neighbor terminal 200. Referring to FIG. 11, if a user selects a notebook 202 from a device map shown in FIG. 11 (a), referring to FIG. 11 (b), the controller 180 can provide a list of shared files set to be shared with the notebook 202. If at least one shared file is selected from the shared file list shown in FIG. 11 (b), referring to FIG. 11 (c), the controller 180 can control the display unit 151 to display a popup window 1110. If 'activate' is selected from the popup window 1110 shown in FIG. 11 (c), it is able to activate the selected file using a computing resource of the notebook 202. Simultaneously, the mobile terminal 100 can receive video data in accordance with the file activation from the notebook 202. And, the controller 180 can control the video data received through the wireless communication unit 110 to be outputted through the display unit 151. As a result, while a user of the mobile terminal 100 is doing a program job through the hardware resource, the user can be also provided with a clouding service for receiving a result of the job remotely.

On the other hand, if 'copy' is selected from the popup window 1110 shown in FIG. 11 (c), the mobile terminal 100 can receive the selected shared file from the notebook 202. The controller 180 is then able to save the shared file received through the wireless communication unit 110 in the memory 160. Moreover, it is a matter of course that a file saved in the mobile terminal 10 can be transmitted to the notebook 202.

On the other hand, if 'delete' is selected from the popup window 1110 shown in FIG. 11 (c), the controller 180 can deliver a control message indicating to delete the selected shared file to the notebook 202 through the wireless communication unit 110. The notebook 202 receives the control message and is then able to delete the selected shared file.

According to the description with reference to FIG. 11, if at least one of the neighbor terminals 200 displayed on the device map is selected, the mobile terminal can share a file with the selected neighbor terminal 200. Moreover, if the hardware and software resources of the neighbor terminal 200 are used, it is able to configure a cloud computing environment using the neighbor terminal 200.

FIG. 11 only shows one example that files can be shared between the mobile terminal 100 and the neighbor terminal 200, by which the present invention may be non-limited. Although FIG. 11 shows one example that files are shared between the notebook 202 and the mobile terminal 100, it is a matter of course that the mobile terminal 100 can be connected to such an electronic device having a storage device as a tablet PC, a smart phone, a smart TV and the like as well as to the notebook. Moreover, although activation, copy or deletion of the shared file can be performed by selecting the corresponding item enumerated on the popup window according to the description with reference to FIG. 11 (c), it just shows one example of a screen for clarity of the description. And, it is a matter of course that other screens different from the screen shown in FIG. 11 (c) can be configured.

Second Embodiment

In case that the neighbor terminal 200 provided through the device map includes a video output device, the mobile terminal 100 can be set to output the same screen as outputted from the neighbor terminal 200.

Figure 12:
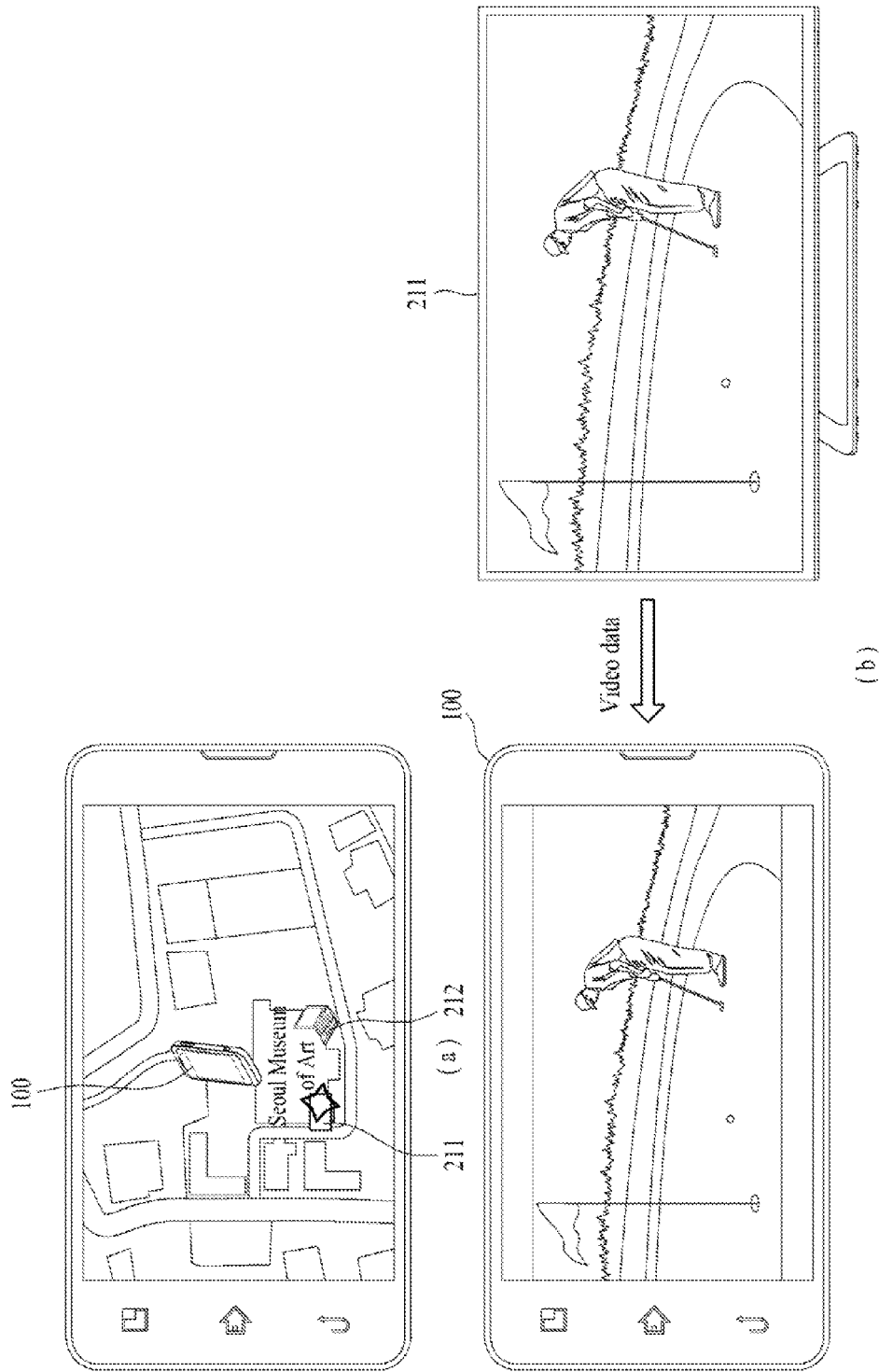
FIG. 12 (a) and FIG. 12 (b) are diagrams for one example to describe a process for a mobile terminal to output the same screen of a neighbor terminal.

FIG. 12 (a) and FIG. 12 (b) are diagrams for one example to describe a process for a mobile terminal 100 to output the same screen of a neighbor terminal 200. If a TV 211 is selected as a video output device from a neighbor terminal list provided through a device map exemplarily shown in FIG. 12 (a), the mobile terminal 100 can receive video data from the TV 211 by real time. Referring to FIG. 12 (c), the controller 180 controls the video data received from the TV 211 by real time to be outputted through the display unit 151, thereby providing a user with a multiscreen environment in which each of the mobile terminal 100 and the neighbor terminal 200 outputs the same screen.

Although FIG. 12 (b) shows one example that the mobile terminal 100 is receiving the video data of the neighbor terminal 200 only, it is a matter of course that the mobile terminal 100 can receive audio data from the neighbor terminal 200 as well as the video data. Moreover, it is unnecessary for each of the mobile terminal 100 and the neighbor terminal 200 to output the same screen. In particular, while a video is outputted from the mobile terminal 100, a screen of the TV 211 may be turned off. If so, a user has an advantage in watching a TV through the mobile terminal 100 not having a broadcast receiving module included therein.

Moreover, in case that the neighbor terminal 200 includes an audio output device such as an audio device, an MP3 player and the like, the mobile terminal 100 receives audio data from the audio output device and then plays the received audio data.

Although FIG. 12 shows one example that the multiscreen environment is configured through the TV 211, it is a matter of course that the present invention is applicable to such a video output device as a tablet PC, a smart phone, a computer, a DVD player and the like as well as to the TV 211.

Third Embodiment

The mobile terminal 100 can control an operation of the neighbor terminal 200 provided through the device map. In particular, the mobile terminal 100 controls a power of the neighbor terminal 200 or may control the neighbor terminal 200 to perform a prescribed function. A process for the mobile terminal 100 to control an operation of the neighbor terminal 200 is described in detail with reference to FIG. 13 as follows.

Figure 13:
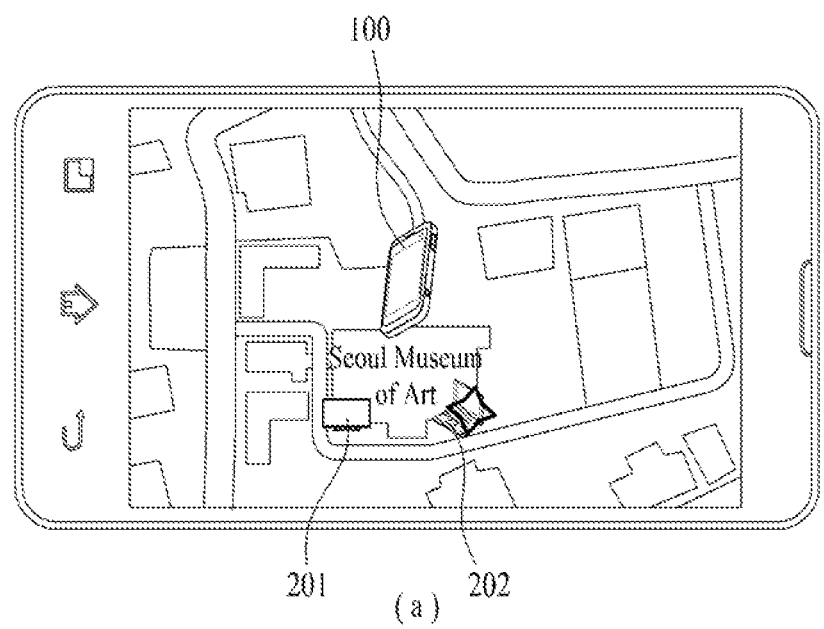
FIG. 13 (a) and FIG. 13 (b) are diagrams for one example of a process for controlling an operation of a neighbor terminal through a mobile terminal.
Figure 13:
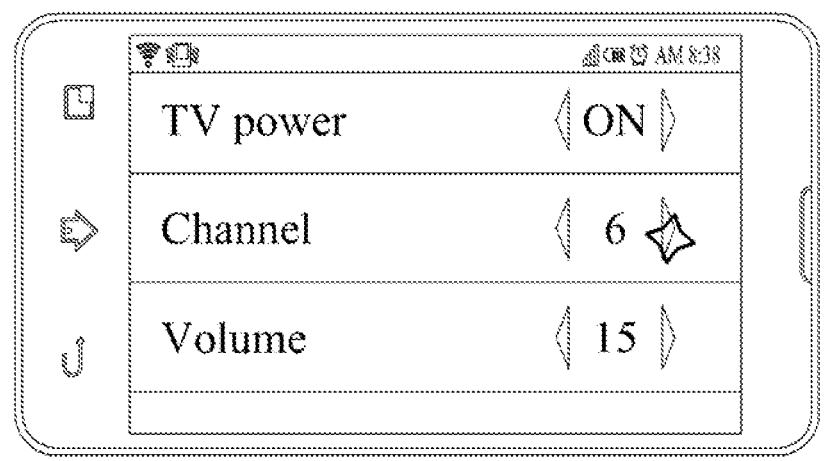

FIG. 13 (a) and FIG. 13 (b) are diagrams for one example of a process for controlling an operation of a neighbor terminal through a mobile terminal. If a prescribed neighbor terminal 200 is selected from a neighbor terminal list provided through a device map exemplarily shown in FIG. 13 (a) [e.g., a TV 221 is selected in FIG. 13 (a)], referring to FIG. 13 (b), the controller 180 can control the display unit 151 to display an operating state of the selected neighbor terminal 200. For instance, in case that the neighbor terminal 200 selected by the user includes the TV 221, as shown in FIG. 13 (a), the controller 180 can control the touchscreen to output an operating state of the TV 221 using a neighbor terminal information received from the TV 221. In the example shown in FIG. 13 (b), an information on a channel outputted through the TV, a volume information of the TV and the like are displayed as well as a power ON/OFF state of the TV 21.

The user can control the power ON/OFF of the TV 221 through the screen provided as shown in FIG. 13 (b) and is also able to adjust a channel and volume outputted through the TV 221. For instance, in the example shown in FIG. 13 (b), if the user switches a channel outputted through the TV 221 from '6' to '11', the channel outputted through the TV 221 can be adjusted into '11' from '6' as well. The controller 180 creates a control message for controlling an operation of the neighbor terminal 200 and is then able to send the created control message to the neighbor terminal 200 through the wireless communication unit 110. By creating the control message for controlling the operation of the neighbor terminal 200, the mobile terminal 100 can be utilized as a remote controller for controlling the operation of the neighbor terminal 200.

Although FIG. 13 shows one example that the operation of the TV 221 is controlled through the mobile terminal 100, it is a matter of course that operations of various electronic devices can be controlled as well as the operation of the TV. For instance, an operation of a washer can be remotely controlled. And, a cooling (or freezing) temperature of a refrigerator can be adjusted. Moreover, ON/OFF of an illumination device can be adjusted remotely. Besides, it is a matter of course that operations of various electronic devices can be controlled as well as the above-enumerated electronic devices.

Fourth Embodiment

In case that a first event occurs in at least one of the neighbor terminals 200 provided through the device map, it is able to set a second event to occur in the mobile terminal 100. In particular, once the first event occurs in the neighbor terminal 200, in order to indicate the occurrence of the first event, it is able to control the second event to occur through the mobile terminal 100.

In the following description, a process for having a first event and a second event occur in the neighbor terminal 200 and the mobile terminal 100, respectively is explained in detail with reference to FIG. 14.

Figure 14:
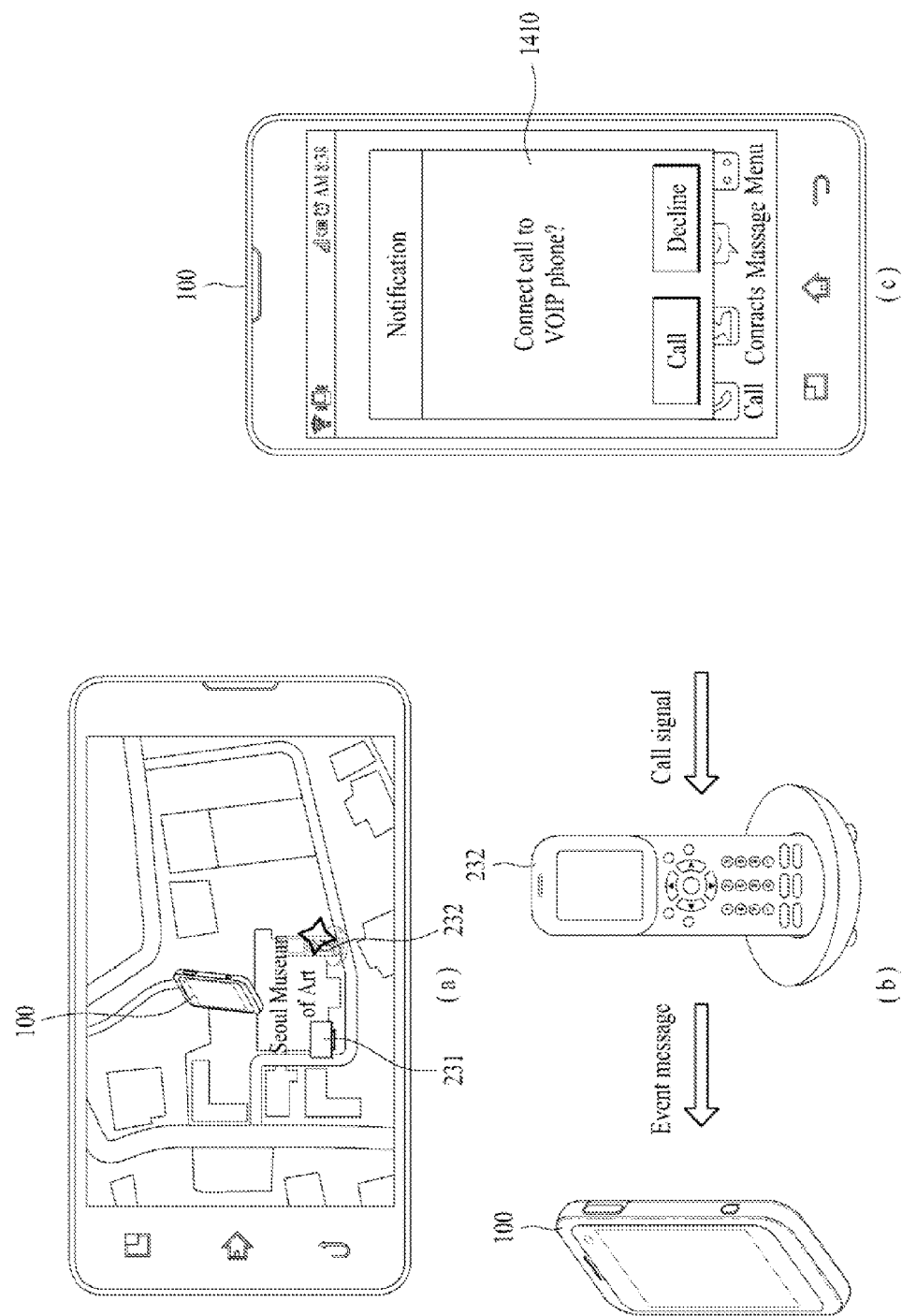
FIGS. 14 (a) to 14 (c) are diagrams for one example to describe that a first event and a second event occur in a neighbor terminal and a mobile terminal, respectively.

FIGS. 14 (a) to 14 (c) are diagrams for one example to describe that a first event and a second event occur in a neighbor terminal 200 and a mobile terminal 100, respectively. If at least one neighbor terminal 200 is selected through a device map provided in FIG. 14 (a), a second event may occur in the mobile terminal 100 in connection with a first event occurring in the neighbor terminal 200.

For instance, when a VOIP phone 232 shown in FIG. 14 (a) is selected as the neighbor terminal 200, if a first event occurs in the VOIP phone 232, it is able to set a second event to occur in the mobile terminal 100 in connection with the first event. Referring to FIG. 14 (b), if a call signal is received by the VOIP phone 232 [first event], the VOIP phone 232 can send an even message to the mobile terminal 100 to indicate that the call signal has been received. If receiving the event message, referring to FIG. 14 (c), the controller 180 controls the audio output module to output a ringtone (or controls a vibration motor to vibrate) and can also control the display unit 151 to output an indication message to indicate that the first event has occurred [second event]. As the ringtone and the indication message are outputted, the user can recognize that the call signal has been received through the VOIP phone 232. If the user selects a button 'call; of the indication message in the course of the occurrence of the second event, the controller 180 controls a call connection to be established. Simultaneously, the controller 180 creates a control message for controlling the VOIP phone 232 to relay audio data, which is provided to the VOIP phone 232, to the mobile terminal and is then able to provide the created control message to the VOIP phone 232.

Referring to FIG. 14 (b) and FIG. 14 (c), if the second event is set to occur in the mobile terminal 100 in connection with an occurrence of the first event in the neighbor terminal 200, a user located in a remote distance can easily recognize that the first event has occurred in the neighbor terminal 200.

Although the description with reference to FIG. 14 is made by taking the VOIP phone 232 as one example, it is a matter of course that the mobile terminal 100 according to the present invention can be connected to various electronic devices as well as to the VOIP phone 232. For instance, in connection with such a first event occurring in one of various electronic devices as a case that a washing process of a washer is ended [first event], a case that a reserved recording starts (or ends) [first event], a case that an interruption occurs in the course of a printer job [first event] and the like, a second event may occur in the mobile terminal 100.

Fifth Embodiment

In the description of the fourth embodiment, after one event has occurred in the neighbor terminal 200, another event occurs in the mobile terminal 100 in connection with the former occurrence. On the contrary, after a first event has occurred in the mobile terminal 100, it is able to set a second event to occur in the neighbor terminal 200. For instance, if a call signal is received by the mobile terminal 100 [first event], it is able to set the VOIP phone shown in FIG. 14 to output a ringtone.

The controller 180 creates an event message to indicate the occurrence of the first event and is then able to send the event message to the neighbor terminal 200 through the wireless communication unit 110. Having received the event message, the neighbor terminal 200 can enable a second event to occur to indicate that the first event has occurred in the mobile terminal 100.

Sixth Embodiment

The mobile terminal 100 can send a text message (e.g., SMS, LMS, MMS, etc.) or an instant message to at least one of neighbor terminals 200 provided through a device map.

Figure 15:
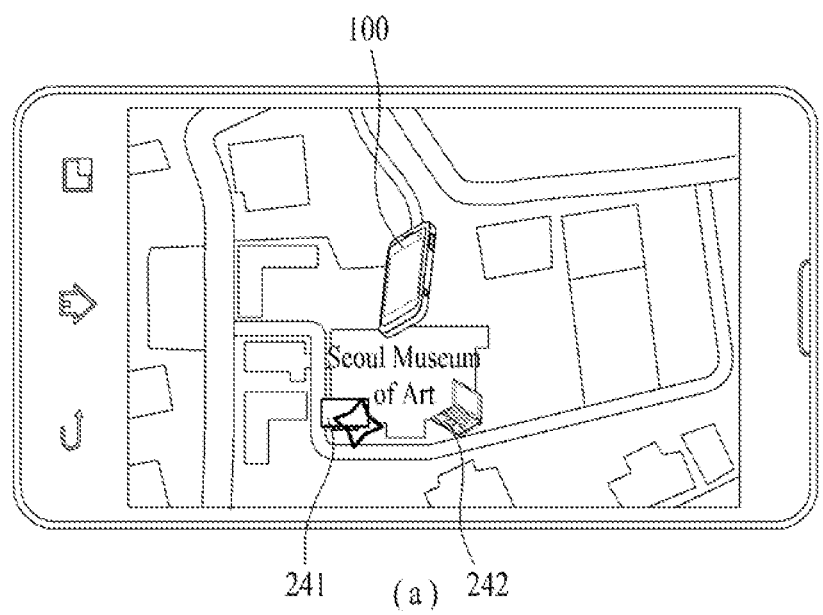
FIG. 15 (a) and FIG. 15 (b) are diagrams for one example to describe a process for sending a text message or an instant message to a neighbor terminal through a mobile terminal.
Figure 15:
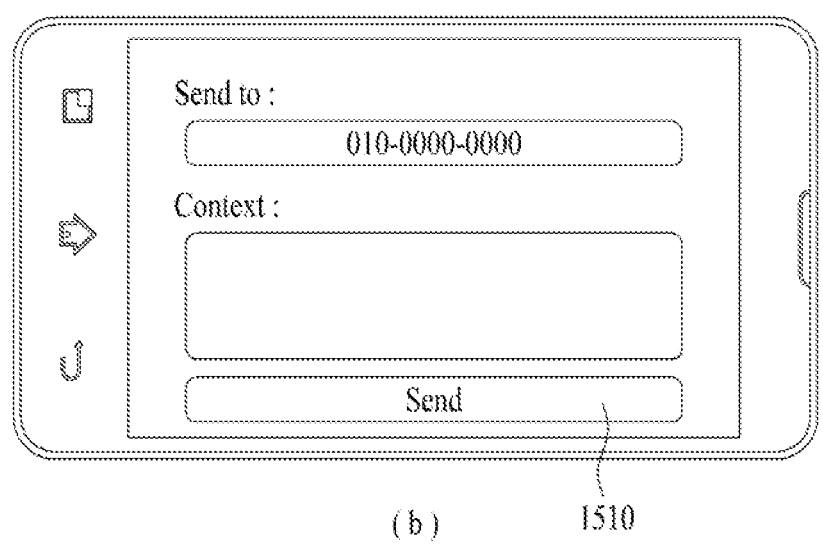

FIG. 15 (a) and FIG. 15 (b) are diagrams for one example to describe a process for sending a text message or an instant message to a neighbor terminal 200 through a mobile terminal 100. A user can select at least one neighbor terminal 200, to which a text message or an instant message will be sent, from a device map shown in FIG. 15 (a). If the selection of the neighbor terminal 200 is completed, referring to FIG. 15 (b), the controller 180 can activate a messaging application for writing a text message or an instant message. Subsequently, if the user inputs a message and then presses (or touches) a send button 1510, the controller 180 can control the message written by the user to be sent to the neighbor terminal (e.g., a tablet PC 241 in FIG. 15 (*a*)) selected in FIG. 15 (*a*).

Like the example shown in FIG. 15, by providing a message to at least one neighbor terminal 200 through a mobile terminal 100, a user can provide an indication message to an unspecific counterpart expected to be located at a location similar to that of the user, i.e., in the same environment by belonging to the same network cell of the user. For instance, if the example shown in FIG. 15 is applied to an office environment, the mobile terminal 100 can be used as an intra-office messenger. Moreover, an advertiser intending to perform a location based advertisement extracts a device located at an advertisement required place and then sends an advertisement message thereto, thereby maximizing an advertisement effect.

If a number resource is allocated to the neighbor terminal 200 like a smart phone, it is able to send a message using one of a text message and an instant message. On the other hand, if a number resource is not allocated to the neighbor terminal 200 like the tablet PC 241 shown in FIG. 15 (*a*), it may be able to send a message using an instant message. Yet, in case of using the instant message, it may be necessary for an application for the instant message transmission and reception to be installed on each of the mobile terminal 100 and the neighbor terminal 200.

Although FIG. 15 (*b*) shows one example that a messaging application for writing a text message or an instant message is activated, it is not mandatory for the messaging application to be activated. For instance, irrespective of the text or instant message writing, the controller 180 can send a message previously saved in the memory 160 to the neighbor terminal 200.

Seventh Embodiment

Figure 16:
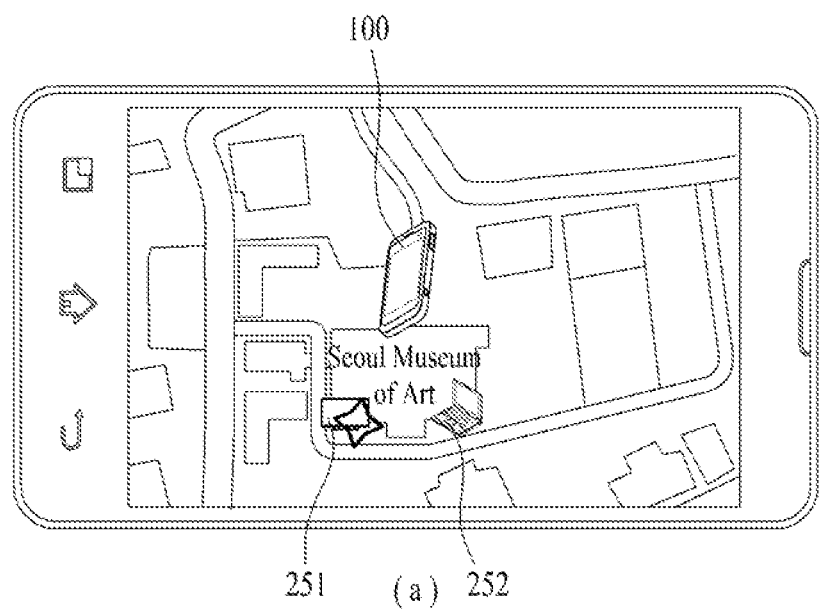
FIG. 16 (a) and FIG. 16 (b) are diagrams for one example to describe a case that the above-mentioned first to sixth embodiments will be used in a single mobile terminal in a manner of being combined together.
Figure 16:
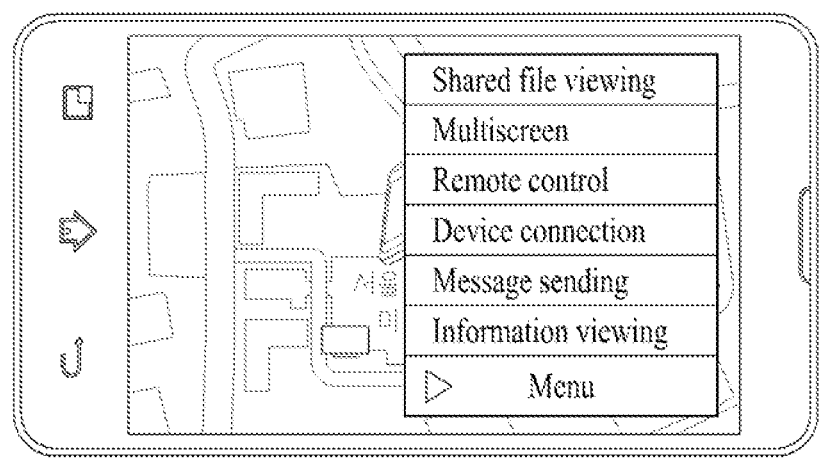

Although the above-described first to sixth embodiments are available separately, they can be used in a manner of being combined together through a single mobile terminal 100. FIG. 16 (*a*) and FIG. 16 (*b*) are diagrams for one example to describe a case that the above-mentioned first to sixth embodiments will be used in a single mobile terminal 100 in a manner of being combined together. If a user selects a prescribed neighbor terminal 200 (e.g., a tablet PC 251 in FIG. 16 (*a*)) from a device map shown in FIG. 16 (*a*), referring to FIG. 16 (*b*), the controller 180 can enumerate a service list of services that can be provided through the selected neighbor terminal 200. If a prescribed service is selected from the service list shown in FIG. 16 (*b*), the controller 180 can control the selected service to be performed.

For instance, in a popup window provided in FIG. 16 (*b*), 'shared file viewing' may be provided to perform the first embodiment and 'multiscreen' may be provided to perform the second embodiment. 'Remote control' displayed on the popup window may be provided to perform the third embodiment. 'Device connection' displayed on the popup window may be provided to perform the fourth embodiment and/or the fifth embodiment. And, 'message sending' may be provided to perform the sixth embodiment.

Moreover, if 'information viewing' is selected from the popup window provided in FIG. 16 (*b*), information on a neighbor device can be provided through the display unit 151. In this case, the neighbor device information may include a communication system supported by the neighbor device, a spaced distance between the neighbor device and the mobile terminal 100 and the like.

Yet, the popup window shown in FIG. 16 (*b*) just shows one example of combining the first to fifth embodiments. And, it may be unnecessary for the first to sixth embodiments to be combined through the popup window shown in FIG. 13. It is a matter of course that it is able to set the first to sixth embodiments to be combined and used through other screen configurations different from the screen configuration shown in FIG. 16 (*b*). And, it is able to set at least one portion of the first to sixth embodiments to be combined and used.

Eighth Embodiment

The mobile terminal 100 according to the present invention accesses a different mobile terminal 100 and can use a device map provided by the different mobile terminal 100. According to the present embodiment, in order to facilitate the discrimination of mobile terminals, the mobile terminal 100 according to the present invention and the different mobile terminal 100 shall be named a first mobile terminal 100 and a second mobile terminal 100, respectively.

In particular, the first mobile terminal 100 accesses the second mobile terminal 100 and is then able to use a device map created based on a network cell to which the second mobile terminal 100 belongs. In this case, it may be unnecessary for each of the first mobile terminal 100 and the second mobile terminal 100 to belong to the same place. The first mobile terminal 100 can access the second mobile terminal 100 using a phone number of IP/MAC address of the second mobile terminal 100. If the phone number or IP address of the second mobile terminal 100 is inputted, the controller 180 of the first mobile terminal 100 can make a request for an access to the second mobile terminal 100 through a wireless internet communication network (or a mobile communication network).

If the first mobile terminal 100 accesses the second mobile terminal 100, the second mobile terminal 100 can provide the device map to the first mobile terminal 100. A user of the first mobile terminal 100 can be provided with various services from neighbor terminals 200 belonging to the same place of the second mobile terminal 100 based on the device map received from the second mobile terminal 100.

In particular, even if the user of the first mobile terminal 100 is located at a place in a long distance from the second mobile terminal 100, the user of the first mobile terminal 100 can be provided with various services from the neighbor terminals 200 existing in the location of the second mobile terminal 100 through the second mobile terminal 100.

Ninth Embodiment

Each time a device map is created, the mobile terminal 100 according to the present invention accumulates the created device map, saves it in the memory 160, and is then able to establish a device map database using the saved maps. If the device map database is established, a user loads the device map previously created at a previously experienced place and is then able to access a neighbor device around the previously experienced place.

For instance, if the mobile terminal 100 is located at a first place, the mobile terminal 100 creates a first device map and then saves it in the memory 160. Thereafter, even if the mobile terminal 100 moves away into a second place different from the first place, a user loads the first device map and is then able to access a neighbor terminal 200 in the first place.

It is a matter of course that the present embodiment can be used by being combined with the eighth embodiment. For instance, the mobile terminal 100 receives a device map from a device map database of the different mobile terminal 100 and is then able to output the device map of the place previously experienced by the different mobile terminal 100.

Tenth Embodiment

The mobile terminal according to the present invention detects its surrounding environment and is then able to control a display of a neighbor terminal 200 to be adjusted on a device map. For instance, if the mobile terminal 100 is located inside a vehicle currently travelling on a road, the mobile terminal 100 can control an icon indicating a neighbor device to be changed into a car shape.

Figure 17:
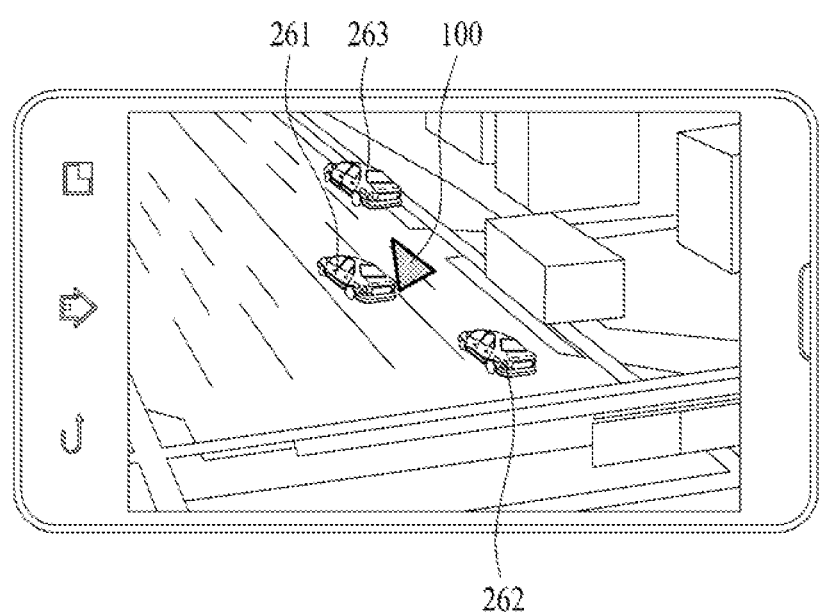
FIG. 17 is a diagram for one example of a device map when a mobile terminal exists in a vehicle that is travelling on a road.

FIG. 17 is a diagram for one example of a device map when a mobile terminal 100 exists in a vehicle that is travelling on a road. Referring to FIG. 17, the controller 180 can control a neighbor terminal 200 to be displayed using a vehicle icon. In particular, in FIG. 17, a user can recognize that 3 neighbor terminals 200 are located at the same place of the mobile terminal 100.

If a moving speed of the mobile terminal 100, which is detected through the position location module 115, is equal to or greater than a prescribed threshold, the controller 180 can determine that the mobile terminal 100 is located within a vehicle currently travelling on a road. In this case, referring to FIG. 17, the controller 180 can control locations of the mobile terminal 100 and the neighbor terminals 200 to be represented as vehicle icons 261 to 263, respectively.

In the example shown in FIG. 17, the controller 180 can control a UI of a device map to be adjusted to become appropriate for a surrounding environment of the mobile terminal 100.

As mentioned in the above description with reference to FIG. 17, in case that the mobile terminal 100 is located within the vehicle, it is a matter of course that the above-described first to eighth embodiments are applicable thereto.

For instance, regarding the third embodiment, if an accident of the vehicle having the neighbor terminal 200 located therein occurs [first event occurrence], the mobile terminal 100 can be provided with an event message indicating the vehicle accident occurrence by the neighbor terminal 200. If the controller receives the event message indicating the vehicle accident occurrence through the wireless communication unit 110, the controller 180 outputs an alarm sound for indicating that the vehicle accident has occurred nearby or can control an alarm message to be displayed [second event occurrence].

On the contrary, if an accident of the vehicle having the mobile terminal 100 located therein occurs [first event occurrence], the controller 180 can send an event message to the neighbor terminal 200 displayed on the device map to indicate the fact of the vehicle accident occurrence. Having received the event message, the neighbor terminal 200 outputs an alarm sound or can control an alarm message to be displayed [second event occurrence].

In particular, if a speed of the mobile terminal 100, which is detected through GPS, decreases abruptly or a deceleration rate of the mobile terminal 100, which is sensed through the sensing unit 140 (particularly, an acceleration sensor), or a strength of impact on the mobile terminal 100 is equal to or greater than a preset level, the controller 180 can determine that an accident occurs in the vehicle.

Moreover, regarding the sixth embodiment, a user exchanges text or instant messages with the neighbor terminal 200 displayed on the device map, thereby recognizing real-time road condition information and instant accident occurrence information.

The above-described methods can be implemented in a program recorded medium as computer-readable codes. The computer-readable media may include all kinds of recording devices in which data readable by a computer system are stored. The computer-readable media may include ROM, RAM, CD-ROM, magnetic tapes, floppy discs, optical data storage devices, and the like for example and also include carrier-wave type implementations (e.g., transmission via Internet). And, the computer may include the controller 180 of the terminal.

It will be appreciated by those skilled in the art that various modifications and variations can be made in the present invention without departing from the spirit or scope of the inventions. Thus, it is intended that the present invention covers the modifications and variations of this invention provided they come within the scope of the appended claims and their equivalents.

INDUSTRIAL APPLICABILITY

Accordingly, a mobile terminal and controlling method thereof according to the present invention are applicable to a wireless communication system utilizing such a wireless communication technology as Bluetooth, CDMA, 3GPP LTE, 3GPP LTE-A, IEEE 802 and the like.

What is claimed is:
1. A mobile terminal, comprising:
a display unit;
a camera capturing a place image corresponding to a location of the mobile terminal;
a wireless communication unit configured to receive:
  location information of the mobile terminal,
  neighbor terminal information about at least one neighbor terminal through an ad-hoc network; and
a controller coupled to a memory and configured to:
  display an interface for selecting one or more search parameters among a plurality of parameters, the plurality of parameters comprising a device type, a specific communication scheme, and a distance from the mobile terminal,
  configure the selected one or more search parameters as a search parameter for filtering the received neighbor terminal information,
  extract one or more neighbor terminals satisfying a condition indicated by the configured search parameter from the at least one neighbor terminal using the received neighbor terminal information,
  generate a device map by marking locations of the extracted one or more neighbor terminals on the place image, and
  update the device map when the locations of the extracted one or more neighbor terminals are changed,
  wherein, if a detected moving speed of the mobile terminal is equal to or greater than a prescribed threshold, the controller is configured to control the display unit to display locations of the mobile terminal and the extracted one or more neighbor terminals as vehicle icons, respectively.

2. The mobile terminal of claim 1, wherein the at least one neighbor terminal comprises a terminal located within a prescribed spaced distance from the mobile terminal.

3. The mobile terminal of claim 1, wherein the at least one neighbor terminal comprises a terminal belongs to a same network as the mobile terminal.

4. The mobile terminal of claim 3, wherein the at least one neighbor terminal comprises a terminal that accesses a same access point as the mobile terminal.

5. The mobile terminal of claim 3, wherein the at least one neighbor terminal comprises a terminal located within a same cell with the mobile terminal.

6. The mobile terminal of claim 1, wherein, if the configured search parameter comprises the device type, the controller is further configured to extract the one or more neighbor terminals from the at least one neighbor terminal if the neighbor device corresponds to the specific device type.

7. The mobile terminal of claim 1, wherein, if the configured search parameter comprises the specific communication scheme, the controller is further configured to extract the one or more neighbor terminals from the at least one neighbor terminal if the neighbor device supports the specific communication scheme.

8. The mobile terminal of claim 1, wherein, if the configured search parameter comprises the distance from the mobile terminal, the controller is further configured to extract the one or more neighbor terminals from the at least one neighbor terminal if the neighbor device is located within the distance from the mobile terminal.

9. The mobile terminal of claim 1, wherein the controller is configured to control the display unit to display the device map which comprises a first marker indicating the locations of the extracted one or more neighbor terminals.

10. The mobile terminal of claim 9, wherein the device map further comprises a second marker indicating the location of the mobile terminal.

11. The mobile terminal of claim 10, wherein the controller is configured to control the first and second markers to be visually discriminated from each other.

12. The mobile terminal of claim 11, wherein one of the first and second markers is represented by a cursor and the other of the first and second markers is represented by an icon.

13. The mobile terminal of claim 1, wherein the place image corresponding to the location of the mobile terminal comprises a map image corresponding to the location of the mobile terminal.

14. The mobile terminal of claim 1, wherein, if an input for selecting one of the extracted one or more neighbor terminals displayed on the device map is received, the controller is configured to perform a data communication with the selected neighbor terminal.

15. The mobile terminal of claim 14, wherein the controller is configured to control the wireless communication unit to receive a file from the neighbor terminal.

16. The mobile terminal of claim 1, wherein, if an input for selecting one of the extracted one or more neighbor terminals displayed on the device map is received, the controller is configured to:
   control the wireless communication unit to receive video from the selected neighbor terminal, and
   control the display unit to display the received video.

17. The mobile terminal of claim 1, wherein, if the wireless communication unit receives an event occurrence message regarding an occurrence of an event from the neighbor terminal displayed on the device map, the controller is configured to output a feedback for informing the occurrence of the event.

* * * * *